United States Patent
Choi et al.

(10) Patent No.: US 12,299,627 B2
(45) Date of Patent: May 13, 2025

(54) MACHINE VISION SYSTEM FOR ADVANCEMENT OF TRAILER LOADING/UNLOADING VISIBILITY

(71) Applicant: United Parcel Service of America, Inc., Atlanta, GA (US)

(72) Inventors: Youngjun Choi, Atlanta, GA (US); Po-Nien Lin, Decatur, GA (US); Hyunki Lee, Johns Creek, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 377 days.

(21) Appl. No.: 17/853,748

(22) Filed: Jun. 29, 2022

(65) Prior Publication Data

US 2024/0005263 A1   Jan. 4, 2024

(51) Int. Cl.
*G06Q 10/08* (2024.01)
*G06Q 10/0835* (2023.01)
*G06V 10/70* (2022.01)

(52) U.S. Cl.
CPC ....... *G06Q 10/08355* (2013.01); *G06V 10/70* (2022.01)

(58) Field of Classification Search
CPC ........... G06Q 10/08355; G06Q 10/083; G06Q 10/109; G06V 10/70; G06V 20/36; G06V 20/59; G06V 20/176; G06V 20/41; G06V 10/22; G06V 20/46; G06V 20/60; B65G 67/20; G06N 20/00

(Continued)

(56) References Cited

U.S. PATENT DOCUMENTS 10,762,331 B1   9/2020   Zhang
2007/0262574 A1   11/2007   Breed et al.
(Continued)

FOREIGN PATENT DOCUMENTS

EP   1883050 A2   1/2008
MA   54888   *   3/2022   ......... G06Q 30/0284
(Continued)

OTHER PUBLICATIONS

European Search Report and Search Opinion received for European Application No. 23182169.5, mailed on Nov. 24, 2023, 13 pages.
(Continued)

*Primary Examiner* — Jerome Grant, II
(74) *Attorney, Agent, or Firm* — Shook, Hardy & Bacon L.L.P.

(57) ABSTRACT

Provided are embodiments for providing analytics indicative of object detection or fill-level detection at or near real-time based on video data captured during an unloading or loading process. A computerized system may detect and classify, using an object-detection machine learning (ML) model, an object based on the video data. A computerized system may further determine, using a fill-level ML model, a fill-level of the storage compartment based on a comparison of edges of the storage compartment to a total dimension corresponding to the edge. In this manner, the various implementations described herein provide a technique for computing systems employing image processing and machine learning techniques to a video data stream to generate analytics associated with the unloading or loading process at or near real-time.

19 Claims, 30 Drawing Sheets

(58) Field of Classification Search
USPC .......................................................... 382/159
See application file for complete search history.

(56) References Cited

U.S. PATENT DOCUMENTS

| | | |
|---|---|---|
| 2008/0025565 A1 | 1/2008 | Zhang et al. |
| 2014/0372183 A1 | 12/2014 | Groble et al. |
| 2017/0140550 A1 | 5/2017 | Zhang et al. |
| 2017/0178333 A1 | 6/2017 | Zhang et al. |
| 2019/0197455 A1 | 6/2019 | Krishnamurthy et al. |
| 2019/0197701 A1 | 6/2019 | Krishnamurthy et al. |
| 2019/0197719 A1 | 6/2019 | Barish et al. |
| 2020/0105008 A1 | 4/2020 | Ehrman et al. |
| 2021/0287013 A1* | 9/2021 | Carter .................... G06F 18/24 |
| 2022/0083767 A1 | 3/2022 | Subramanian et al. |

FOREIGN PATENT DOCUMENTS

| | | | | |
|---|---|---|---|---|
| WO | 2019/173811 A2 | 9/2019 | | |
| WO | WO2020202741 | * 10/2020 | ............. | G08G 1/166 |
| WO | WO2020117479 | * 11/2020 | ............... | G06K 9/00 |

OTHER PUBLICATIONS

Wu L. et al., "Deep learning based basketball video analysis for intelligent arena application", Multimedia Tools and Applications, Kluwer Academic Publishers, vol. 76, No. 23, (Aug. 2, 2017), pp. 24983-25001.

* cited by examiner

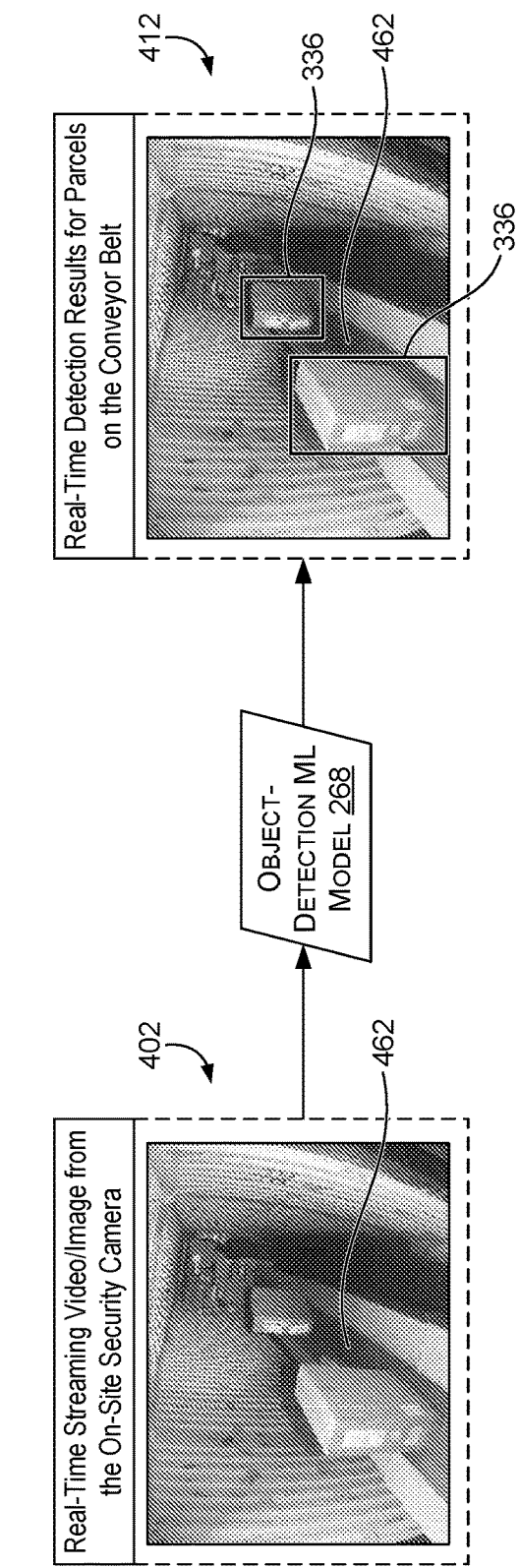
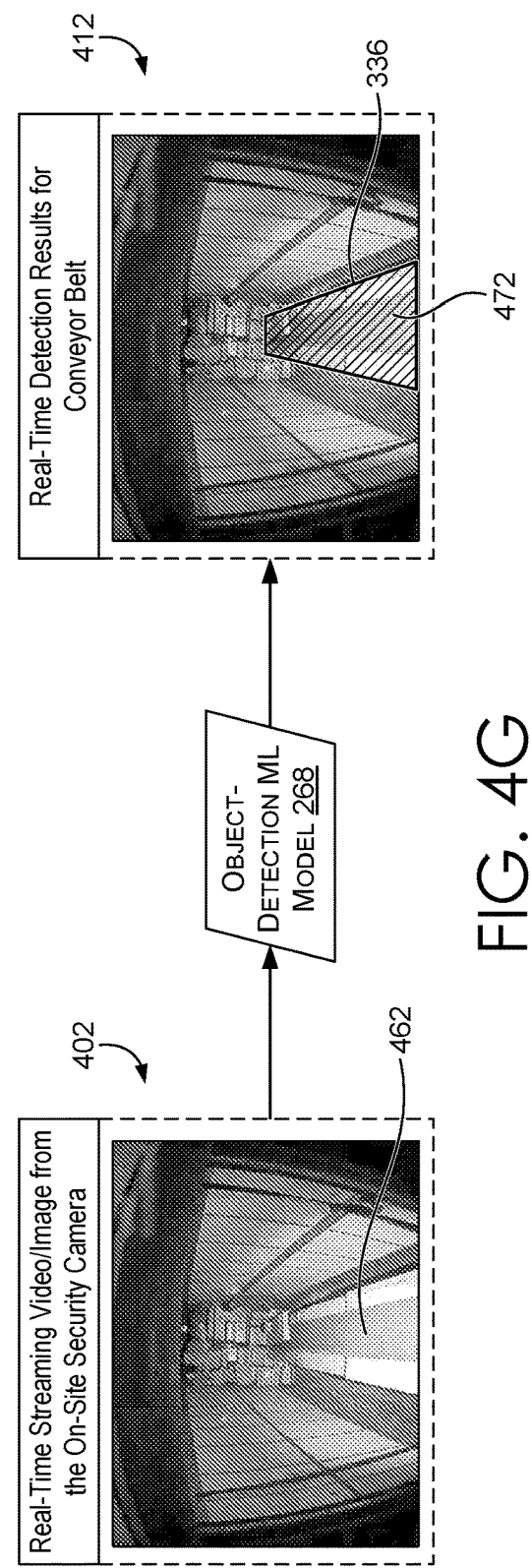
FIG. 4F
FIG. 4G

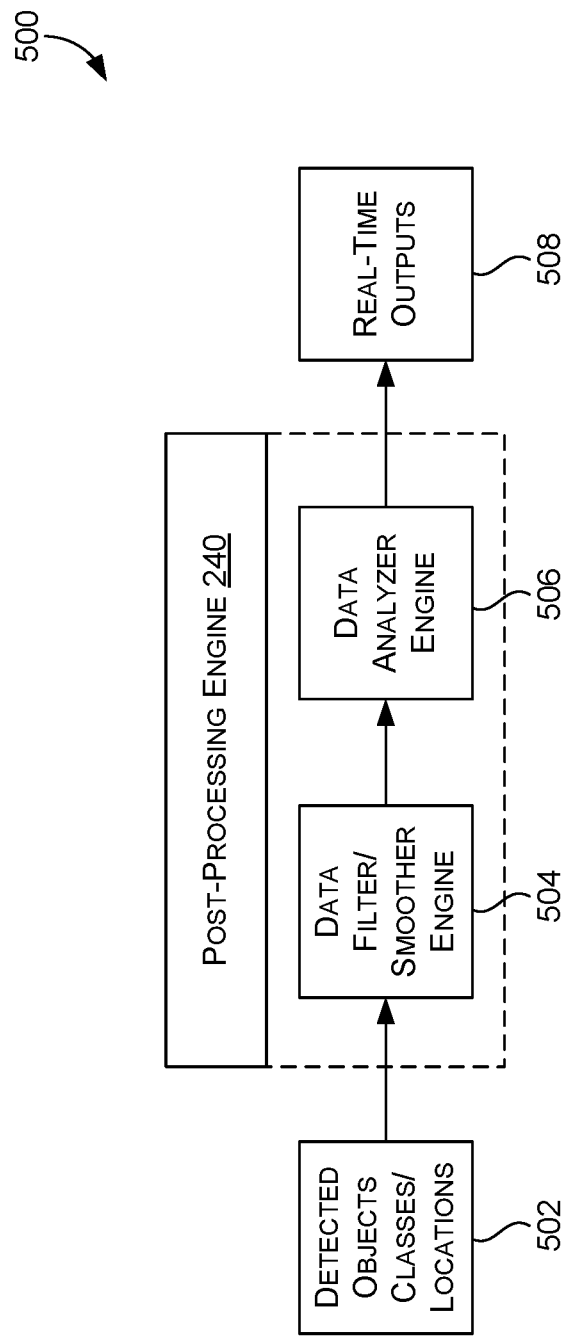

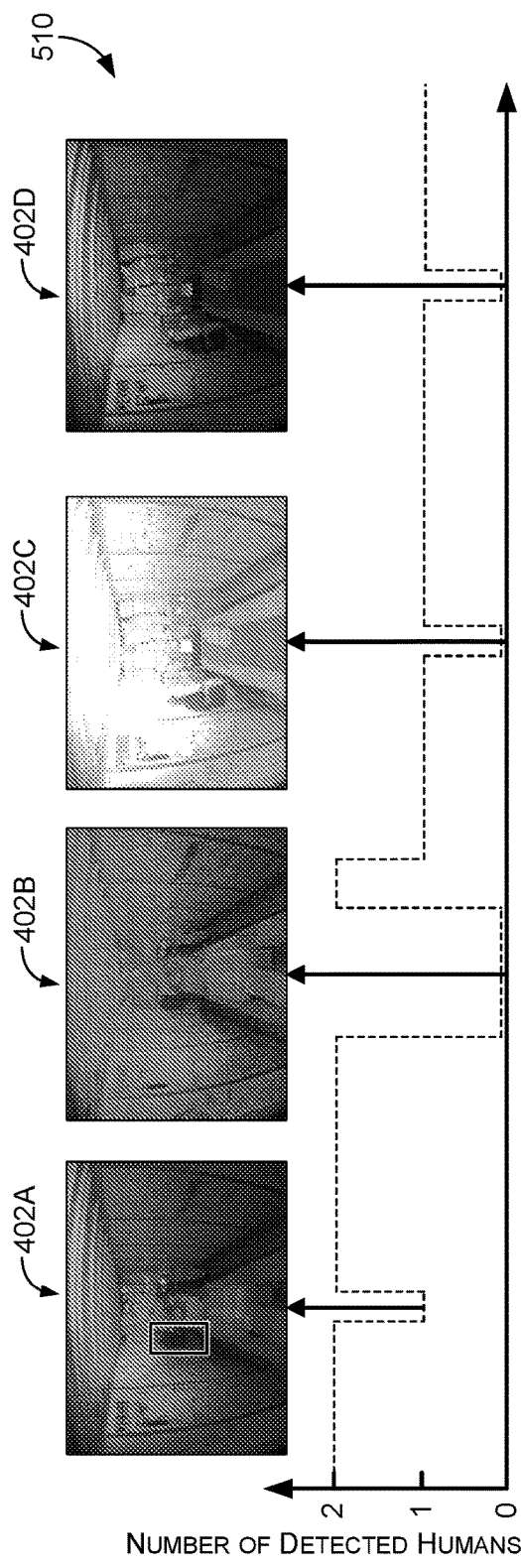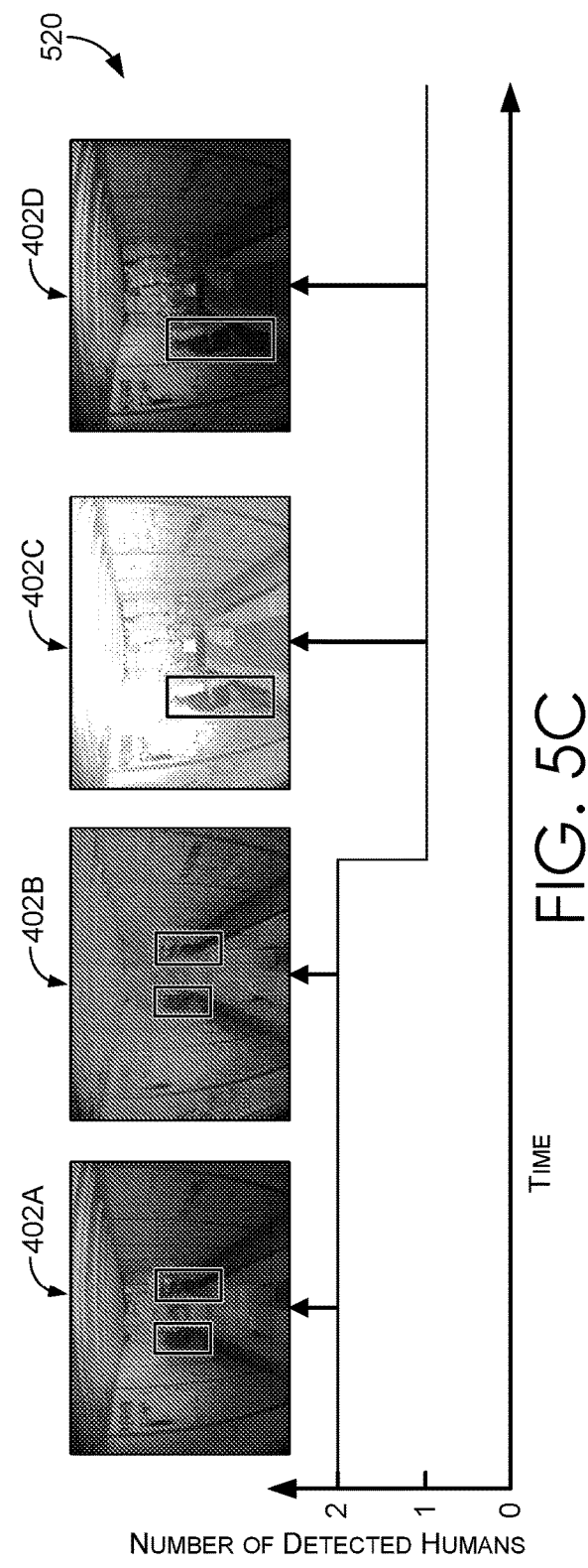
FIG. 5B — BEFORE DATA FILTER/SMOOTHER ENGINE
FIG. 5C — AFTER DATA FILTER/SMOOTHER ENGINE

MACHINE VISION SYSTEM FOR ADVANCEMENT OF TRAILER LOADING/UNLOADING VISIBILITY

BACKGROUND

Transportation of items is typically a delivery process that includes personnel identifying items needed to be transported; loading the items onto a transportation vessel, such as a vehicle, a ship, a train, a plane, and the like; operating the transportation vessel to a drop-off location; and unloading the items at the drop-off location. This delivery process may be performed by delivery companies, moving companies, personnel relocating to another home, and so forth. Efficiently completing this delivery process provides these personnel with more resources or time to complete other tasks. Computer-implemented technologies can assist users in facilitating the delivery process. Example computer-implemented technologies include computer applications or services such as global positioning systems (GPS) to facilitate navigation of the transportation vessel to the drop off location, task-managing services to facilitate scheduling the delivery, and the like.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technologies described in this disclosure are directed toward computerized systems and methods for providing analytics indicative of object detection or fill-level detection at or near real-time based on video data captured during an unloading or loading process, for example, to assess efficiency. A computerized system may detect and classify an object based on the video data. The computerized system may determine a fill-level, for example, expressed as a percentage, fraction, time until completion, or visual progress indication, based on the video data.

In particular, an aspect of the present disclosure may include receiving a video of the real-time or near real-time state of the inside of a storage compartment, such as the inside of a loading trailer, while items are being loaded onto or out of the storage compartment. The video may include a video stream of the storage compartment as captured by a camera, such as a monocular camera. Video data may be extracted from the video, to determine at least one video data feature. The video data feature may correspond to an individual measurable property, such as a characteristic of an object being detected in the video (e.g., referred to as "object-detection feature") or of a fill-level of the unloading process (e.g., referred to as "fill-level data feature"). The detectable object may include a human object, a pallet object, a load stand object, a parcel retainer object, a parcel (on a conveyer belt object), a forever bag object, a conveyer belt object, or a small container object, and the like. The fill-level may include an indication of the level of fullness of items in the storage compartment, for example, expressed as a percentage (e.g., percent full), fraction (¼, ⅓, ½, and so forth), a time to completion of the loading (to 100%) or unloading (to 0% full), or any other visual indication.

Aspects of the present disclosure include determining a fill-level associated with the inside of the storage compartment based on at least the video and the fill-level data feature, as well as detecting, tracking, and/or classifying an object detected inside the storage compartment based at least on the video and the object-detection data feature. Thereafter, analytics indicative of the determined fill-level and the classified object may be generated at or near real-time. The analytics may be generated based on a classification and/or predictive machine learning model, for example. Aspects of the present disclosure include communicating the analytics to an external device, such as a display, to provide real-time indications regarding the objects detected and the fill-level of the storage compartment.

In this manner, the various implementations described herein provide a technique to computing systems employing image processing and machine learning techniques to a video data stream to generate analytics associated with the unloading or loading process at or near real-time. Whereas conventional approaches fail to provide any analytics in association with a video of the unloading process occurring, and instead may require an administrator to manually monitor the individual in-bound/out-bound bay doors (which may cause unnecessary expenses associated with having a dedicated administrator, for each storage compartment being loaded/unloaded, who may fail to manually identify objects or determine a fill-level), aspects of the present disclosure can automatically determine a fill-level of the storage compartment, as well as detect, track, and classify an object in the storage compartment, at or near real-time. By automatically determining a fill-level and classifying an object, target analytics may be determined and communicated in the form of graphical user interface (GUI) elements, alerts, data analytics to provide real-time visibility, analytics, estimates to completion, and so forth.

Accordingly, present embodiments provide improved technologies for generating, at or near real-time, analytics indicative of a fill-level and objects detected in a computationally inexpensive manner (e.g., employing computationally inexpensive machine learning techniques on two-dimensional video frames) and reduce error and expenses associated with instead of having a dedicated administrator make such determination for a large number of storage compartments being loaded or unloaded.

BRIEF DESCRIPTION OF THE DRAWINGS

The technology described herein is described in detail below with reference to the attached drawing figures, wherein:

FIG. 4F is a flow diagram of an example process of an object-detection ML model being applied to detect objects in video frames, according to some embodiments of this disclosure;

FIG. 4G is a flow diagram of an example process of an object-detection ML model being applied to detect objects in video frames, according to some embodiments of this disclosure;

FIG. 5A is a flow diagram of an example process for post-processing data associated with classified objects, according to some embodiments of this disclosure;

FIG. 5B is a graph diagram of an example time graph of results of an object-detection ML model being applied before post-processing engine is employed, according to some embodiments of this disclosure;

FIG. 5C is a graph diagram of an example time graph of results of an object-detection ML model employing a post-processing engine, according to some embodiments of this disclosure;

DETAILED DESCRIPTION OF THE INVENTION

Figure 1:
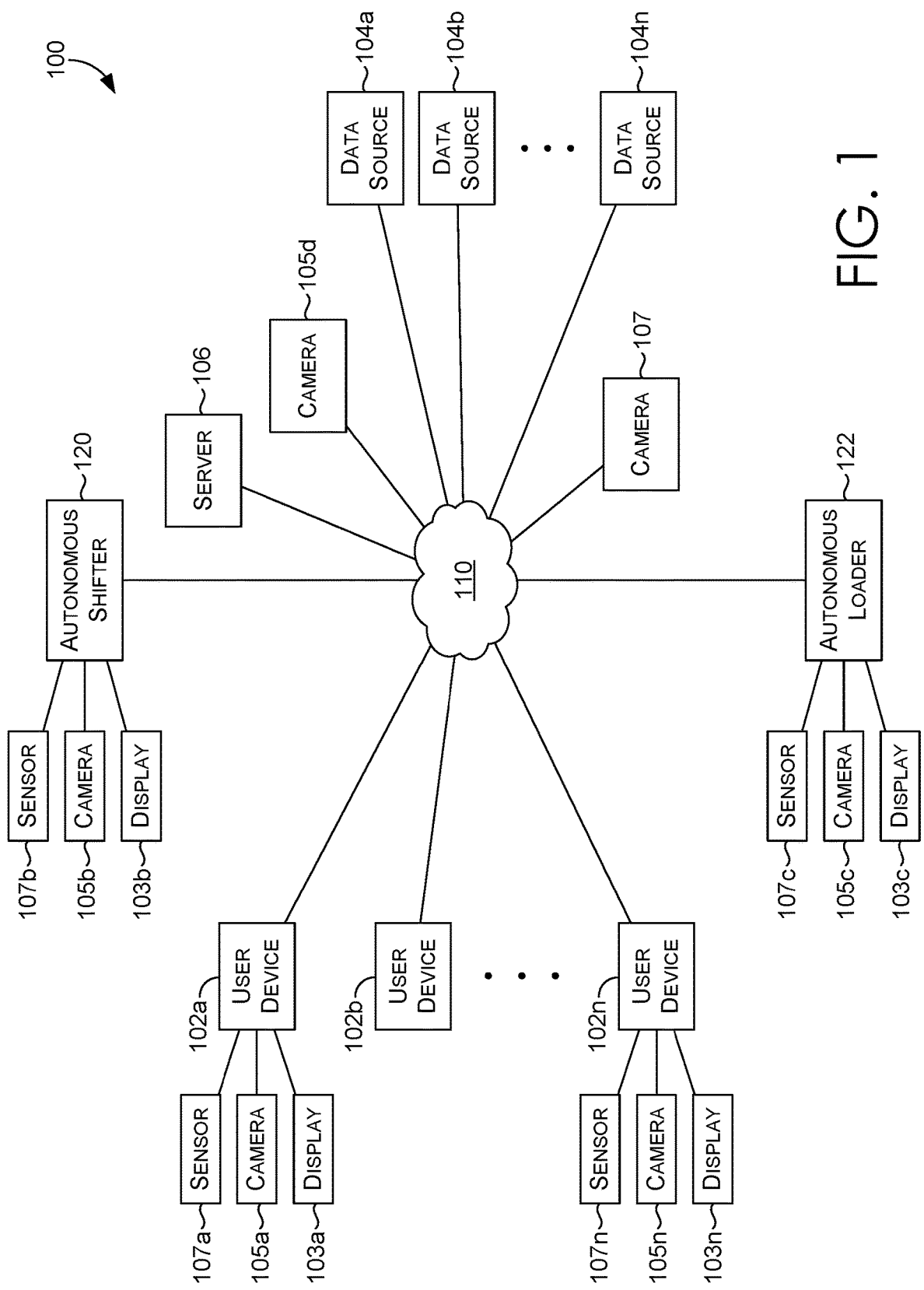
FIG. 1 is a block diagram of an exemplary computing environment suitable for use in implementing some embodiments of this disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Aspects of this disclosure are directed toward computer technologies for providing analytics indicative of object detection or fill-level detection at or near real-time based on video data associated with a video (e.g., live video stream) captured by a camera during an unloading or loading process. For example and at a high level, a computerized system may detect, track, and classify an object based on the video data, and the computerized system may determine a fill-level expressed as a percentage or time until completion may be determined based on the video data.

As used herein, the "video stream" or "video" may correspond to a continuous transmission of video frames or images from one device, such as a camera or a server, to another device, such as a server, computing device, or client device. From the video, computer technologies may extract video data, which, as user herein, may refer to disparate types of structured or unstructured data that can be determined from the video, including but not limited to video data indicative of pixels and associated time stamps, changes in pixels, and so forth. In some embodiments, the video data is frame-specific. As used herein, the "loading process" or the "unloading process" may refer to the steps associated with loading to or unloading items from a storage compartment, either through a manual process, an automatic process (for example, using robots and other computing system, such as those discussed herein, among others), or a combination thereof. Although the embodiments discussed herein include people performing the loading/unloading process, it should be understood that any alternative or additional mechanisms may be used to perform the loading/unloading process, including but not limited to robotic devices, an autonomous shifter, an autonomous loader, building equipment (such as cranes, backhoes, and so forth), or conveyor belts, to name a few. The "loading/unloading process" may be used to refer collectively to the process of displacing items within (by loading the items into and/or unloading the items out of) the storage compartment. As used herein, "storage compartment" may refer to any suitable space that temporarily stores items, for example, for temporary storage, cooling, transportation, and/or so forth. Example storage compartments include a trailer, a storage facility sitting on real property, a warehouse, or an office space, to name a few.

Conventionally, existing approaches may fail to provide users with computing logic and infrastructure to generate analytics at or near real-time indicative of progress during the delivery process. As a result, certain existing approaches cause inefficiencies for enterprises or personnel looking to improve their operations by ensuring that items have been unloaded and planning for future deliveries. In particular, many existing approaches fail to provide a resource and computationally efficient technique for generating, at or near-real time associated with loading items onto and unloading items from a storage compartment during the delivery process; the implementation of which is difficult to achieve in practice given the engineering, hardware, and data processing challenges of such a possible solution.

As such, many existing approaches suffer from inefficiencies, such as: failing to ensure that items have been unloaded, not allowing for the foresight to plan future deliveries, providing inaccurate predictions regarding completion times so that enterprises and personnel can plan future deliveries, and so forth. At most, existing approaches may employ purely historical data to predict an ending time of the unloading/loading process. However, the historical data fails to account how the current loading/unloading process may differ from the samples making up the historical data (for example, based on the number of employees currently completing the loading/unloading process, the size of the current storage compartment, the number of items to load/unload, and so forth). As such, the existing approach employing historical data may be inaccurate and unfeasible across different loading/unloading processes. First, as a result of this inaccuracy, the door to the storage compartment may degrade at a faster rate due to opening and closing the door more often than necessary. For example, the door may close because the historical data inaccurately predicted that the loading/unloading process has been completed, but the door would have to be reopened since the loading/unloading process has in fact not been completed. Second, as a result of this inaccuracy, the door to the storage compartment may close when it has been inaccurately predicted based on this historical data that the loading/unloading process has been completed. For example, the door may close when there are personnel still performing the loading/unloading process. Third, in some instances, an automatic system (e.g., employing an automatic door and a conveyer) may fail to load or unload parcels from a temporary storage compartment. In these automatic systems, the door may automatically close and open based on the historical data, such that any disruption to the unloading process may cause the automatic door to close or open before the loading/unloading process is complete. As a result, it may be beneficial to develop a system providing real-time analytics with an option for detecting an object, such as a person, and further for providing real-time predictive analytics to avoid inaccurate estimates regarding the loading.

Another existing approach may include employing a LiDAR sensor. A LiDAR sensor is a device that determines ranges by targeting an object or a surface with a leisure and measuring the reflected light to return to a receiver of the LiDAR sensor. One drawback of LiDAR sensors includes the computational expenses associated with operating the LiDAR sensor, which becomes more resource intensive as LiDAR sensors become added to storage compartments. Further, many existing storage compartments do not currently include LiDAR sensors, yet some existing storage compartments may include an existing camera, such as a security camera or a monocular camera. Thus, leveraging hardware that may currently exist in the storage compartment may facilitate scaling so that object detection using the existing cameras may be incorporated into a wider range of storage compartments. The burden associated with scaling may further be reduced through the use of computationally inexpensive operations, such as those discussed herein.

With this in mind, aspects of the present disclosure include receiving a video of the real-time or near real-time state of the inside of a storage compartment, such as the inside of a trailer while items are being loaded onto or out of the storage compartment. The video may include a video of the storage compartment as captured by a camera, such as a monocular camera. Video data may be extracted from the video, to determine at least one video data feature. The video data feature may correspond to an individual measurable property, such as a characteristic of an object being detected in the video (e.g., referred to as "object-detection feature") or of a fill-level of the unloading process (e.g., referred to as "fill-level data feature"). The video data features can be conveniently described by a feature vector, such as an nth dimensional vector of numerical features that represent some phenomena, where n is any positive integer, such as 1, 2, 3, and so forth. The video data features may be used to train an object-detection machine learning (ML) model and a fill-level ML model, as discussed herein.

In the context of training a ML model, such as the object-detection ML model and the fill-level ML model discussed herein, the video data features may correspond to "edges" and "objects." An "edge" in an image may refer to an image contour across which the brightness or hue of the image changes, for example, in the magnitude or in the rate of change in the magnitude. The edge may be detected using histograms or Gaussian convolution numerical methods.

The edges in an object may include the surface-normal discontinuity (top vs. side), depth discontinuities (e.g., side of an object), surface-reflectance or reflective discontinuities (e.g., text or ink), or illumination discontinuities (e.g., shadows), to name a few. An "object" in an image may refer to an entity identified as separate from another entity or background, for example, based on edges separating the entities from each other or from a background. For example, an object may be detected based on a gradient threshold that is exceeded for gradients between neighboring pixels.

The object-detection ML model may be trained using supervised learning whereby training data, such as label data and/or unlabeled data, is provided to the object-detection ML model as discussed herein. For example, the labeled data may include a positive or negative label for a corresponding edge or object. For example, labeled data for a human object, a pallet object, a load stand object, a parcel retainer object, a parcel on a conveyer belt object, a forever bag object, a conveyer belt object, or a small container object, and the like, may be provided to the object-detection ML model. However, it should be understood that the object-detection ML model may also be trained via suitable techniques other than supervised learning, including unsupervised or reinforcement learning, as may be appreciated by a person having ordinary skill in the art.

Similarly, the fill-level ML model may be trained using supervised learning whereby training data, such as label data and/or unlabeled data, may be provided to the fill-level ML model as discussed herein. For example, the labeled data may include a positive or negative label for a corresponding edge or object. For example, labeled data for a plurality of edges corresponding to intersections of planes (e.g., intersection of the side wall with the floor), may be provided to the fill-level ML model. However, it should be understood that the object-detection ML model may also be trained via suitable techniques other than supervised learning, including unsupervised or reinforcement learning, as would be appreciate by a person having ordinary skill in the art.

Aspects of the present disclosure include determining, using the fill-level ML model, a fill-level associated with the inside of the storage compartment based on at least the video and the fill-level data feature. Additionally, aspects of the present disclosure include detecting, tracking, and classifying, using the object-detection ML model, an object detected inside the storage compartment based at least on the video and the object-detection data feature. Thereafter, analytics indicative of the determined fill-level and the classified object may be generated at or near real-time. As discussed, herein the output of the object-detection ML model (e.g., the classified object) and the fill-level ML model (e.g., the determined fill-level) may be post-processed, as discussed herein, to improve results. Aspects of the present disclosure include communicating the analytics to an external device, such as a display to provide real-time indications, symbols, or icons regarding the objects detected and the fill-level of the storage compartment. Additionally or alternatively, an autonomous shifter, an autonomous loader, and/or a storage door may be operationally controlled based on the analytics to coordinate other aspects of a delivery process, such as the loading/unloading process, a transportation process, and so forth.

Accordingly, embodiments described herein provide improved technologies for computer systems for, among other aspects, enabling a computer system to train and employ the object-detection ML model and the fill-level ML model to determine and generate analytics indicative of an object detected or a fill-level associated with the inside of a storage compartment during the loading/unloading process. Because many storage compartments may include a camera, scaling is facilitated through the embodiments discussed herein, which employ computationally inexpensive processing of 2-dimensional images and applying machine learning operations. In this way, embodiments provide new, enhanced object-detection and fill-level determination technologies during the loading/unloading processes and also reduce resources that would be required from installation of new LiDAR sensors in each storage compartment or from manual assignment of a designated administrator to each storage compartment.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor or processing circuitry executing instructions stored in memory.

Among other components not shown, example operating environment 100 includes a number of user devices, such as user devices 102*a* and 102*b* through 102*n*; displays 103*a* and 103*b* through 103*n*; a number of data sources, such as data sources 104*a* and 104*b* through 104*n*; a number of cameras, such as cameras 105*a* and 105*b* through 105*n*; server 106; sensors, such as sensors 107*a* and 107*b* through 107*n*; network 110; autonomous shifter 120; and autonomous loader 122. It should be understood that environment 100 as shown in FIG. 1 is an example of one suitable operating environment. Any or each of the components shown in FIG. 1 may be implemented via any type of hardware component having a computing device, such as computing device 1100 as described in connection to FIG. 11, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks employing any suitable communication protocol.

It should be understood that any number of user devices, shifters, loaders, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

As used herein, "autonomous shifter" refers to a transportation device, such as a vehicle (e.g., electric vehicle), used for coupling to, decoupling from, and transporting semi-trailers and other containers (hereinafter referred to as "trailer" or "storage compartments") storing items for transportation. In one embodiment, the autonomous shifter comprises at least one computing device, such as the computing device 1100 shown in FIG. 11, configured to execute computer-readable instructions to automatically couple the autonomous shifter to trailer(s), automatically transport the trailer(s) to target drop-off locations, and/or automatically find another trailer(s) to couple to.

Figure 11:
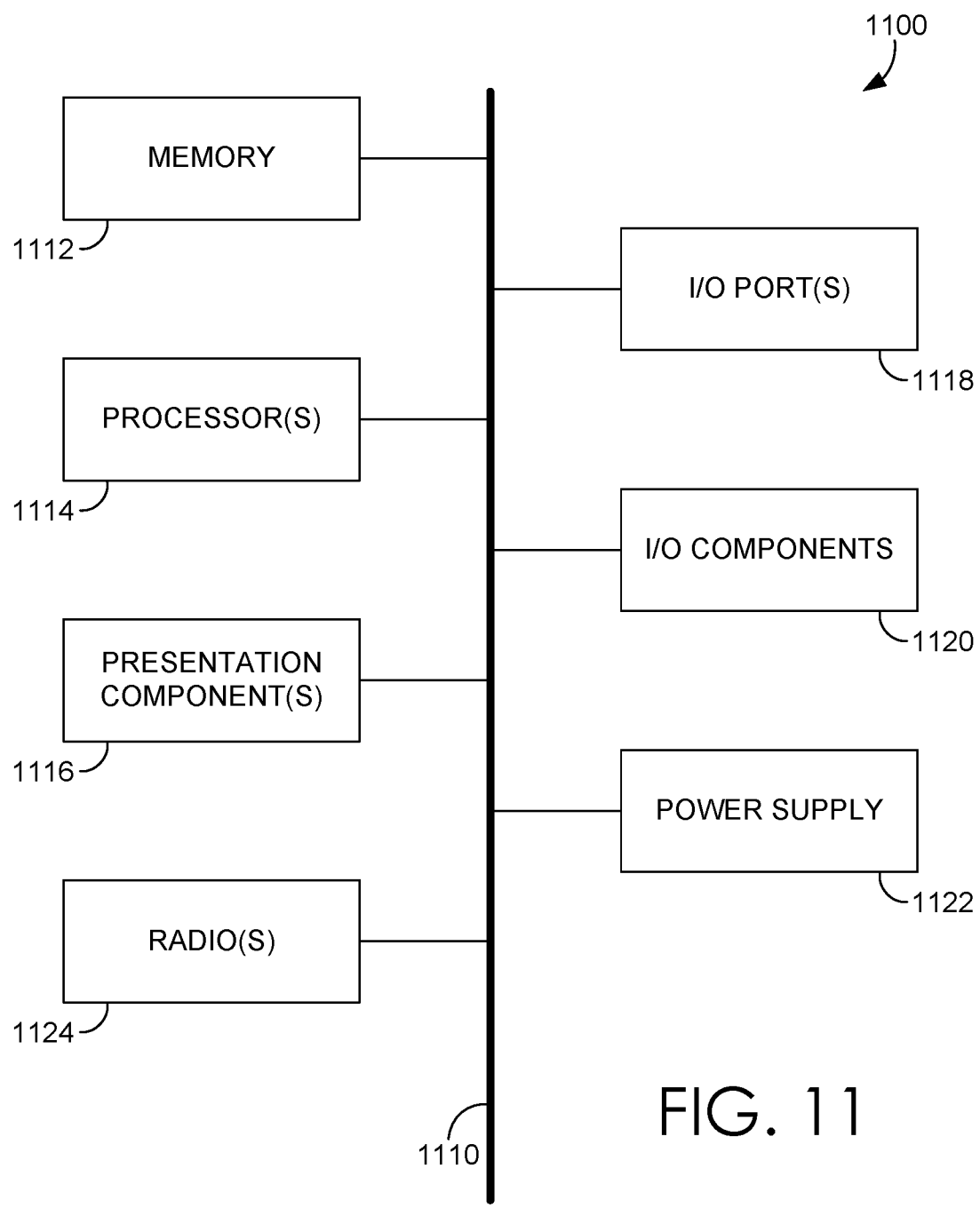
FIG. 11 is a block diagram of a computing device for which embodiments of this disclosure are employed.

As used herein, "autonomous loader" refers to any loading device, such as a robot, used to automatically load items to a storage compartment (e.g., trailer) or unload items from the storage compartment, for example, for the autonomous shifter to transport the loaded or unloaded trailer as discussed herein. Example autonomous loaders may include an autonomous forklift or conveyer system. In one embodiment, the autonomous loader comprises a computing device, such as the computing device 1100 as shown in FIG. 11, configured to execute computer-readable instructions to automatically load items onto the trailer(s), automatically organize the items on the trailer(s), and/or automatically unload the items from the trailer(s). In this manner, the autonomous shifter 120 and the autonomous loader 122 may perform the delivery process discussed above without any manual human intervention or with less manual human intervention than using certain existing manual approaches.

User devices 102a and 102b through 102n, the autonomous shifter 120, and/or the autonomous loader 122 can be client devices on the client-side of operating environment 100 while server 106 can be on the server-side of operating environment 100. Server 106 can comprise server-side software designed to work in conjunction with client-side software on user devices 102a and 102b through 102n, the autonomous shifter 120, and/or the autonomous loader 122 to implement any combination of the embodiments and functionalities discussed in the present disclosure. This division of operating environment 100 is provided to illustrate one example of a suitable environment, and there is no requirement for each implementation that any combination of server 106, the autonomous shifter 120, the autonomous loader 122, and user devices 102a and 102b through 102n remain as separate entities. The displays 103a and 103b through 103n may be integrated into the user devices 102a and 102b through 102n, the autonomous shifter 120, and/or the autonomous loader 122. In one embodiment, the displays 103a and 103b through 103n are touchscreen displays.

User devices 102a and 102b through 102n may comprise any type of computing device capable of use by a user. For example, in one embodiment, user devices 102a and 102b through 102n may be the type of computing device 1100 described in relation to FIG. 11. By way of example and not limitation, a user device may be embodied as a personal computer (PC), a laptop computer, a mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device. In the context of an autonomous system, any of user devices 102a and 102b through 102n may be integrated into the autonomous shifter 120 or the autonomous loader 122.

Data sources 104a and 104b through 104n may comprise data sources and/or data systems, which are configured to make data available to any of the various constituents of operating environment 100, or system 200 described in connection to FIG. 2. For instance, in one embodiment, one or more data sources 104a through 104n provide (or make available for accessing) the objects that were classified and detected, as well as the fill-level determined by the trailer AI engine 210 of FIG. 2 and deployed by the object and fill-level analytics deploying engine 270 of FIG. 2. Data sources 104a and 104b through 104n may be discrete from user devices 102a and 102b through 102n, autonomous shifter 120, the autonomous loader 122, and server 106. Alternatively, the data sources 104a through 104n may be incorporated and/or integrated into at least one of those components. In one embodiment, one or more of data sources 104a through 104n may be integrated into, associated with, and/or accessible to one or more of the user device(s) 102a, 102b, or 102n, autonomous shifter 120, autonomous loader 122, or server 106. Examples of computations performed by server 106, autonomous shifter 120, autonomous loader 122, or user devices 102, and/or corresponding data made available by data sources 104a through 104n are described further in connection to system 200 of FIG. 2.

In one embodiment, one or more of data sources 104a through 104n comprise one or more sensors 107 or cameras 105, which may be integrated into or associated with one or more of the user device(s) 102a, 102b, or 102n or server 106. Examples of data made available by data sources 104a through 104n are described further in connection to video collector 212 of FIG. 2. The cameras 105 may include any device capable of recording visual images (e.g., two-dimensional images) in the form of photographs, film, video signals, and so forth, to generate a stream of video. By way of non-limiting example, the cameras 105 may include at least one of a monocular camera, a compact camera, a bridge camera, or a mirrorless camera. In one embodiment, the cameras 105 may include a camera that is already installed inside of a storage compartment, for example, for security and monitoring purposes.

Figure 2:
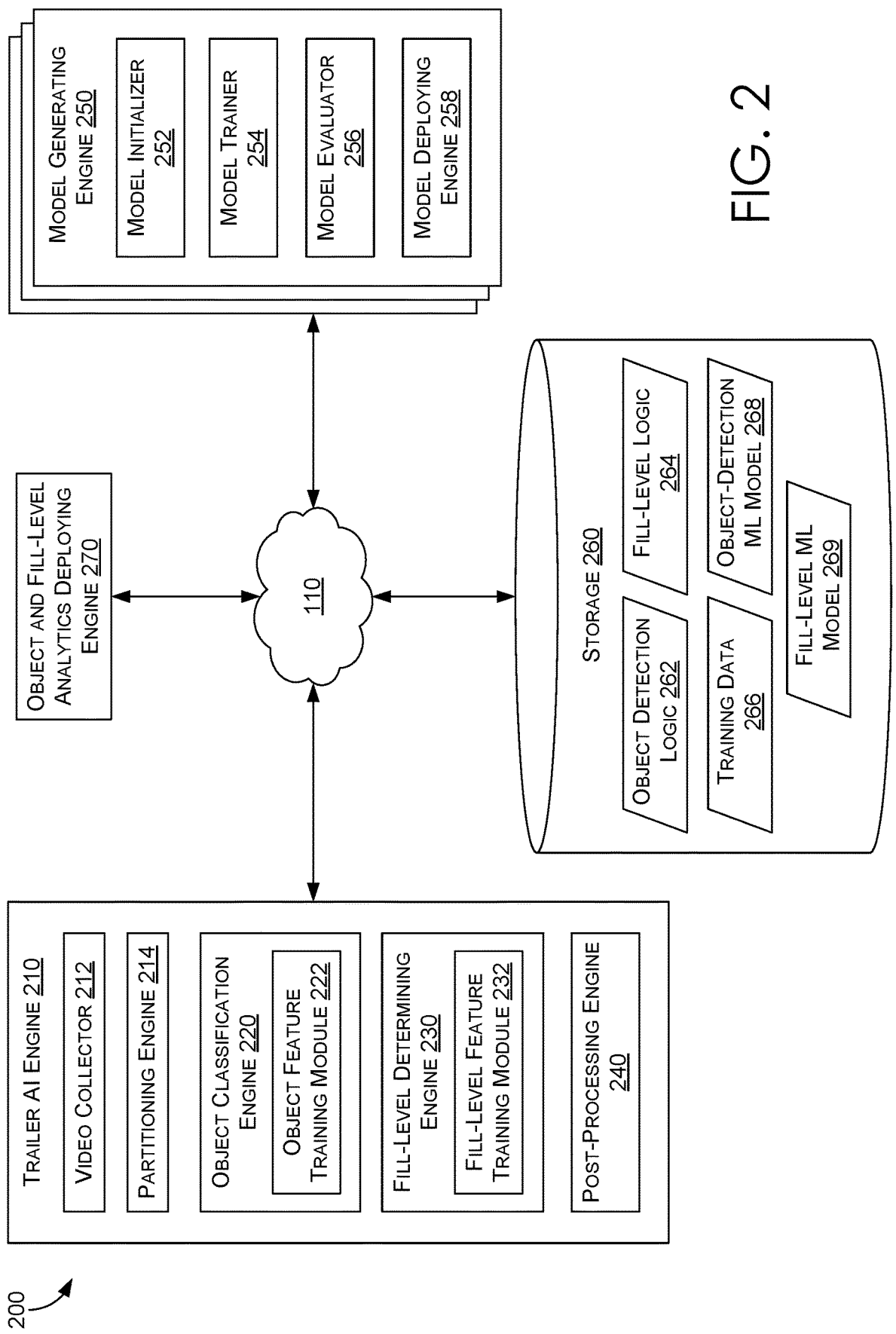
FIG. 2 is a block diagram illustrating an example system in which some embodiments of this disclosure are employed.

Operating environment 100 can be utilized to implement one or more of the components of system 200, as described in association with FIG. 2. Operating environment 100 also can be utilized for implementing aspects of process flows 800, 900, and 1000 as described in FIGS. 8, 9, and 10, respectively. Turning to FIG. 2, depicted is a block diagram illustrating an example system 200 in which some embodiments of this disclosure are employed. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes a network 110, which is described in connection to FIG. 1, and which communicatively couples components of system 200 including trailer AI engine 210 (which includes video collector 212, partitioning engine 214, object classification engine 220, object feature training module 222, fill-level determining engine 230, fill-level feature training module 232, and post-processing engine 240), model generating engine 250 (which includes model initializer 252, model trainer 254, model evaluator 256, and model deploying engine 258), and storage 260 (which includes object detection logic 262, fill-level logic 264, training data 266, and object-detection machine learning (ML) model 268, and fill-level ML model 269), and object and fill-level analytics deploying engine 270. The trailer AI engine 210 and the model generating engine 250 may be embodied as a set of compiled computer instructions or functions, program modules, computer software services, or an arrangement of processes carried out on one or more computer systems, such as computing device 1100 as described in connection to FIG. 11, for example.

In one embodiment, the functions performed by components of system 200 are associated with one or more applications, services, or routines. In one embodiment, certain applications, services, or routines may operate on one or more user devices (such as user device 102*a*), one or more servers (such as server 106), and may be distributed across one or more user devices and servers, or may be implemented in a cloud-based system, such as that illustrated in FIG. 12. Moreover, in some embodiments, these components of system 200 may be distributed across a network, including one or more servers (such as server 106) and client devices (such as user device 102*a*), in the cloud, may reside on a user device (such as user device 102*a*), or may reside on the autonomous shifter 120 or autonomous loader 122 of FIG. 1. Moreover, these components and/or functions performed by these components, or services carried out by these components may be implemented at appropriate abstraction layer(s) such as the operating system layer, application layer, hardware layer, and so forth, of the computing system(s). Alternatively, or in addition, the functionality of these components and/or the embodiments of the disclosure described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth. Additionally, although functionality is described herein with reference to specific components shown in example system 200, it is contemplated that in some embodiments functionality of these components can be shared or distributed across other components.

Continuing with FIG. 2, the trailer AI engine 210 is generally responsible for detecting, tracking, and classifying objects, as well as determining (e.g., predicting) a fill-level of items associated with a loading/unloading process, based on a stream of video, as described herein. The trailer AI engine 210 may then generate analytics indicative of the determined fill-level and the classified object. In this manner, the delivery process may be improved and certain otherwise manual aspects may be automated through the use of the real-time analytics disclosed herein. In particular, the disclosed subject matter provides improved technologies for generating, at or near real-time, analytics indicative of a fill-level and objects detected. These analytics may be generated in a computationally inexpensive manner (e.g., employing computationally inexpensive machine learning techniques on two-dimensional video frames) and reduce error and expenses associated with having a dedicated administrator make such determinations for a large number of storage compartments being simultaneously loaded or unloaded.

The video collector 212 of the trailer AI engine 210 may be configured to receive or access a video data associated with a video, such as a (real-time) stream of video, a recording of a video, video frames, saved document, and/or any content formatted in any suitable manner. Example video formats include, but are not limited to MPEG-4 Part 14 (MP4) file, a MOV file, a QuickTime File Format (QTFF) file, a WMV file, an AVI file, an Advanced Video Coding High Definition (AVCHD) file, a WebM file, MKV file, or any other suitable video formatted file. As used herein, "video frame" may refer to one or more still images which compose a complete moving picture (i.e., the video). In one embodiment, the video frame may be formatted using any of the aforementioned formats or any additional formats. Alternatively or additionally, the trailer AI engine 210 or the model generating engine 250 may receive images formatted in any suitable image format, including but not limited to Joint Photographic Experts Group (JPEG/JFIF), Exchangeable image file format (Exif), Tagged Image File Format (TIFF), Graphics Interchange Format (GIF), BMP file format (Windows bitmap), Portable Network Graphics (PNG), Portable Pixmap (PPM), WebP, BAT, and the like.

Video may be received from a camera 105 (FIG. 1) recording the inside of a storage compartment. In some embodiments, the camera 105 of any client device 102 (FIG. 1) may be positioned inside of a storage compartment, such as the inside of a trailer. In particular, a camera 105 of a computing device may capture a video of the inside of the storage compartment, and the video may be communicated to a software application associated with the object classification engine 220 and/or the fill-level determining engine 230. Indeed, the video may be communicated to the trailer AI engine 210 via any suitable communication technique via network 110. For example, the video collector 212 may integrate (e.g., via a suitable application peripheral interface (API)) with a camera application of a computing device, such that the video may be directly communicated from the camera application to the trailer AI engine 210 by way of the video collector 212. In some embodiments, the video collector 212 receives the video as raw data. The video may be continuously received, cached, and processed by the video collector 212.

The partitioning engine 214 is configured to divide the video into computer-recognizable components. In some embodiments, the partitioning engine 214 is configured to determine video frames from the video. The partitioning engine 214 may divide the video into a set of video frames that may be processed for detecting, tracking, and classifying objects, as well as determining a fill-level. The partitioning engine 214 may determine an object based on any suitable image processing technique. For example, an object may be determined based on edges separating pixels or candidate objects from each other or from a background. For example, an object may be detected based on a gradient threshold that is exceeded for gradients between neighboring pixels. For example, the partitioning engine 214 may partition a video or video frame into candidate objects that are classified by the object classification engine 220.

In some embodiment, the partitioning engine 214 may determine a position of the candidate objects. In some embodiments, the partitioning engine 214 may determine coordinates of the candidate objects relative to the entire video frame, relative to each other, and the like. In one embodiment, the partitioning engine 214 may divide the video frame into any number of partitions. For example, the partitioning engine 214 may divide the video frame into a grid (for example, a 100 by 100 grid having 10,000 grid elements) having uniform or non-uniform grid elements. The partitioning engine 214 may assign x-coordinates (for example, horizontal coordinates) and y-coordinates (for example, vertical coordinates). In one embodiment, the x-coordinates and the y-coordinates are perpendicular to each other. Coordinates of each of the candidate objects may be determined based on the grid and/or the x and y coordinates. The partitioning engine 214 may generate a position profile for each candidate object, such that the position profile includes x and y coordinates of the profile of the candidate object. In this manner, the candidate objects identified in the video frame may better be related to each other, as well as to the entire video frame to better determine the video data. Indeed, a computing system may be better able to detect, track, and classify the object, as well as to determine the fill-level based on a relationship between a position profile of the candidate objects.

The partitioning engine 214 may determine and generate video data based on the video frame. In some embodiments, the partitioning engine 214 may determine and/or generate the video data based on the partitions of the video frames and/or based on the position profile of the candidate objects. For example, the partitioning engine 214 may process the raw video data and generate video data, as discussed below. The video data may include machine-encoded edge information, position information, color information, and so forth, corresponding to the video frame and its corresponding objects. The partitioning engine 214 may extract video data for the video frame(s) based on the candidate objects and their respective positions on the above-referenced coordinates. Extracting video data may include determining the partitioned elements in the image (e.g., the candidate objects) and a position profile for the candidate objects. As discussed below with respect to the model generating engine 250, herein, the video data may be processed by the model generating engine to train and generate a machine learning model, such as the object-detection ML model 268 and the fill-level ML model 269.

Continuing with FIG. 2, the object classification engine 220 is configured with computing logic, such as the object detection logic 262, to detect, track, and classify of the candidate object determined by the partitioning engine 214. It should be understood that, in some embodiments, the object classification engine 220 (instead of or in addition to the partitioning engine 214) may determine the object in the video frame. The object classification engine 220 may identify the object based on the object detection logic 262. In some embodiments, the object classification engine 220 classifies and tracks the object in the video frame based on the video data. For example, the object classification engine 220 may employ object classification methodologies to determine a context and classification of objects identified in the video frame. In some embodiments, the object classification engine 220 may employ the object-detection ML model 268 that is trained and generated by the model generating engine 250. The object detection logic 262 may define logic for using the object-detection ML model 268 to detect, track, and classify an object. For example, the object-detection ML model 268 may include a deep learning model, a neural network model, a logistic regression model, a support vector machine model, and the like. The machine learning model may employ a You Only Look Once (YOLO) methodology, Region-based Convolutional Neural Network (R-CNN) methodology, Single Shot Detector (SSD) methodology, and the like.

The object classification engine 220 may detect, track, and/or classify the object (e.g., candidate object) based on the object-detection ML model 268 being trained based on a set of object-detection data feature. The object feature training module 222 may be configured with computing logic, such as the object detection logic 262, to determine and generate object-detection data feature that may be used to train the object-detection ML model 268. In one embodiment, the object feature training module 222 may determine the object-detection data feature used to train the machine learning model via any suitable process. For example, the object feature training module 222 may determine the object-detection data feature via any suitable engineering process, which may include at least one of the following steps: brainstorming or testing features, deciding which features to create, creating the features, testing the impact of the created features on an object or training data, and iteratively improving features. Object-detection data feature may be engineered by the object feature training module 222 using any suitable computations, including, but not limited to, (1) numerical transformation (e.g., taking fractions or scaling), (2) employing a category encoder to categorize data, (3) clustering techniques, (4) group aggregation values, (5) principal component analysis, and the like. In some embodiments, the object feature training module 222 may assign different levels of significance to the video data, such that certain object-detection data features that have a higher level of significant are weighted accordingly when the model trainer 254 trains the object-detection ML model 268. In this manner, the model trainer 254 may prioritize and/or rank video data features to improve identifying, tracking, and/or classifying the object.

The object classification engine 220 may employ any suitable classification or prediction algorithm to classify and/or predict the identity of an object (e.g., the candidate object identified by the partitioning engine), for example, based on the object-detection data features. The object classification engine 220 may classify the object based on the video. Example objects include a human object, a pallet object, a load stand object, a parcel retainer object, a parcel on a conveyer belt object, a forever bag object, a conveyer belt object, or a small container object. Based on the objects, the object classification engine 220 may determine a dock door status (e.g., door status), the number of loading/unloading workers (e.g., humans or robots), a parcel on the conveyer belt, the usage of retainer/load stand, and so forth. It should be understood that the embodiments disclosed herein may be broadly applied to predict any suitable object, in addition to or other than those described herein.

Continuing with FIG. 2, the fill-level determining engine 230 may be configured with computing logic, such as the fill-level logic 264, to determine a fill-level of a storage compartment at or near real-time. The fill-level determining engine 230 may determine the fill-level based on pixel information or the coordinates of a video frame, for example, as generated by the partitioning engine 214. The fill-level determining engine 230 determines the fill-level based on the fill-level logic 264. In some embodiments, the fill-level determining engine 230 determines the fill-level based on the edges between the floor and side walls. The edges may be determined based on the partitioning engine 214 or the fill-level determining engine 230. For example, the edges 622, as illustrated in FIG. 6B, between the floor and the side walls may correspond to bottom-right and bottom-left edges extending toward the back wall inside the storage compartment. The fill-level determining engine 230 may receive information indicative of the length of the storage compartment from the storage 260. The dimensions (e.g., length) of the storage compartment may be based on the type of storage compartment. For example, the storage 260 may store information indicative of the type of storage compartment from which the video was received. In one embodiment, storage 260 may store information associated with the dimensions (e.g., length) of the storage compartment based on which camera produced the video, such that the camera from which the video is received is indexed to the storage compartment.

The fill-level determining engine 230 may employ any suitable (e.g., predictive) methodologies to determine a context and fill-level of a storage container based on the video frame(s). In some embodiments, the fill-level determining engine 230 may employ a machine learning model, such as the fill-level ML model 269, that is trained and generated by the model generating engine 250. The fill-level logic 264 may define logic for training and using fill-level ML model 269 to determine the fill-level. For example, the fill-level ML model 269 may include a deep learning model, a neural network model, a logistic regression model, a support vector machine model, or any suitable model employing lane detection architectures. The fill-level ML model 269 may employ a UFAST methodology, a top-to-down Lane Detection Framework Based on Conditional Convolution (CondLaneNet) methodology, FOLOLane methodology (e.g., that predicts the geometry of a lane marker by estimating adjacent key points), and the like.

The fill-level determining engine 230 may determine the fill-level based on a machine learning model, such as the fill-level ML model 269, that is trained based on a set of fill-level data features. The fill-level feature training module 232 may be configured with computing logic, such as the fill-level logic 264, to determine and generate fill-level data features that may be used to train the fill-level ML model 269. In one embodiment, the fill-level feature training module 232 may determine the fill-level data feature(s) used to train the fill-level ML model 269 via any suitable process. For example, the fill-level feature training module 232 may determine the fill-level data feature via any suitable engineering process, which may include at least one of the following steps: brainstorming or testing features, deciding which features to create, creating the features, testing the impact of the created features on an object or training data, and iteratively improving features. Fill-level data feature may be engineered by the fill-level feature training module 232 using any suitable computations, including, but not limited to, (1) numerical transformation (e.g., taking fractions or scaling), (2) employing a category encoder to categorize data, (3) clustering techniques, (4) group aggregation values, (5) principal component analysis, and the like. In some embodiments, the fill-level feature training module 232 may assign different levels of significance to the video data, such that certain fill-level data features that have a higher level of significance are weighted accordingly when the model trainer 254 trains the fill-level ML model 269. In this manner, the model trainer 254 may prioritize and/or rank video data features to improve identifying, tracking, and/or classifying the object.

The fill-level determining engine 230 may employ any suitable algorithm to determine the fill-level, for example, based on the fill-level data features. The fill-level determining engine 230 may determine the fill-level by applying any of the aforementioned (or any additional suitable) methodologies discussed above to the video. In some embodiments, the fill-level may be expressed as a percentage or time until completion. As discussed above, the fill-level determining engine 230 may determine the fill-level based on the edges between the floor and side walls (e.g., edges correspond to bottom-right and bottom-left edges extending toward the back wall inside the storage compartment, as illustrated in FIG. 6B). It should be understood that the embodiments disclosed herein may be broadly applied to predict any suitable object, in addition to or other than those described in this paragraph.

The post-processing engine 240 may improve results of the object classified by the object classification engine 220 and of the fill-level predicted by the fill-level determining engine 230. In some embodiments, the post-processing engine 240 employs post-processing logic of the object detection logic 262 or of the fill-level logic 264 to improve the predictions and classifications. The post-processing logic may define intent-specific instructions for filtering, smoothening, and further analyzing data. For example, the post-processing engine 240 may perform various pruning routines, rule quality processing, rule filtering, rule combination, model combination, and time-stamped image processing. A more detailed discussion of the post-processing engine 240 applied to outputs of the object classification engine 220 is discussed below with respect to FIGS. 4A and 5A. Similarly, a more detailed discussion of the engine 240 applied to outputs of the fill-level determining engine 230 is discussed below with respect to FIGS. 6A and 7A.

In the context of the object classification engine 220, the post-processing engine 240 may be implemented to further improve the detection results. In one embodiment, the post-processing engine 240 may comprise of two post-processing engines, namely, a data filter/smoother engine 504 of FIG. 5A and a data analyzer engine 506 of FIG. 5A. First, the data filter/smoother engine 504 may remove the noise or small fluctuations of the detection results from the minor instability of the loading/unloading environment. For example, the changing of light condition inside a trailer or poor image resolution because of low internet bandwidth can cause the object classification engine 220 to miss detection of an object in a short period of time, so the estimation accuracy can be improved by adding the proposed filter/smoother engine 504 of FIG. 5A.

Second, the data analyzer engine 506 of FIG. 5A may generate real-time outputs from a data analyzer for operational purposes. In some embodiments, the data analyzer engine 506 may generate (1) real-time detection results and trailer information in each time stamp, and (2) up-to-date summary of the current trailer loading/unloading process. With regard to (1), the trailer information includes trailer's dimensions (width, length, and height), source/destination location, trailer's ID, name of the current processing facility, camera name and bay number for the current loading/unloading process; the real-time detection results include a number of humans, pallets, and many other targeted objects that were detected for every designated time stamp inside a loading/unloading trailer. During a loading/unloading process these real-time detection results and trailer information may be combined and uploaded to a table on a UPS cloud storage space. With regard to (2), the summary information of the detection results may be calculated and updated for the video frame associated with designated time stamps. This information may include an indication of the maximum/minimum of the number of the targeted objects/statuses, cumulated processing time, dock door open/close time, remaining number of targeted objects. At the end of a trailer loading/unloading process, the up-to-date summary and trailer information may be combined and uploaded to a table stored in storage 260 (FIG. 2).

The object and fill-level analytics deploying engine 270 may be configured with computing logic to configure the analytics output by the trailer AI engine 210 (e.g., via the object classification engine 220 and/or the fill-level determining engine 230) for use in any suitable abstraction layer, for example, user device 102*a*. In some embodiments, the object and fill-level analytics deploying engine 270 may receive the classified objects from the object classification engine 220 and the predicted fill-level from the fill-level determining engine 230. Based on the classified object and/or the predicted fill-level, the object and fill-level analytics deploying engine 270 may deploy the associated analytics and any suitable alerts (e.g., an alert indicative of a person locked inside the storage compartment, an indication of a fill-level, etc.) to an associated software application, such as any suitable work management or scheduling application. For example, in response to the trailer AI engine 210 determining the fill-level and classifying the objects, the object and fill-level analytics deploying engine 270 may format and deploy analytics for display on a GUI, as illustrated in the screenshots depicted at least in FIGS. 3B, 3C, 3E, 3G, 4B, 4C, 4D, 4E, 4F, 4G, 4H, 4I, 5B, 5C, 6B, and/or 6C.

In some embodiments, the object and fill-level analytics deploying engine 270 may communicate with any software application or computing device via any suitable API or other communication means. For example, the object and fill-level analytics deploying engine 270 may communicate with the autonomous shifter 120 and/or the autonomous loader 122. The autonomous shifter 120 and/or the autonomous loader 122 may coordinate with each other (and other devices) to complete aspects of the delivery process (e.g., unloading or loading documents). Although this example includes the object and fill-level analytics deploying engine 270 formatting, configuring, and communicating the analytics for use by an autonomous device, the embodiments disclosed herein are not limited to this user. For example, the object and fill-level analytics deploying engine 270 may instead or additionally communicate analytics to a software application of an application layer for generating the GUIs discussed herein. It should be understood that the object and fill-level analytics deploying engine 270 may format, configure, and communicate the task to any suitable abstract layer, such as an operating system layer, another application layer, or a hardware layer.

Continuing with FIG. 2, the model generating engine 250 may train and generate a machine learning model (e.g., the object-detection ML model 268 and the fill-level ML model 269) that may be employed by the trailer AI engine 210. The model initializer 252 may select and initialize a machine learning model. Initializing the machine learning model may include causing the model initializer 252 to determine model parameters and provide initial conditions for the model parameters. In one embodiment, the initial conditions for the model parameters may include a coefficient for the model parameter.

The model trainer 254 may train the machine learning model determined by the model initializer 252. As part of training the machine learning model, the model trainer 254 may receive outputs from the model initializer 252 to train the machine learning model (e.g., the object-detection ML model 268 and the fill-level ML model 269). In some embodiments, the model trainer 254 may receive the type of machine learning model, the loss function associated with the machine learning model, the parameters used to train the machine learning model, and the initial conditions for the model parameters. Example loss functions include a standard cross entropy loss function, a focal loss function, a dice loss function, and a self-adjusting loss function, to name a few. The model trainer 254 may iteratively train the machine learning model. In one embodiment, training the machine learning model may include employing an optimizer that trains the machine learning model, using training data 266, until certain conditions are met, for example, as determined by the model evaluator 256. Alternatively, the model trainer 254 may feed one set of training data 266 to the machine learning model to generate a predicted output that is used by the model evaluator 256.

Example training data 266 includes any labeled data or unlabeled data. In one embodiment, an unlabeled 2D image of the storage compartment (e.g., trailer) is received, and delineating features between the floor and the wall are identified and tagged with a label identifying the pixels associated with the features. By way of non-limiting example, training data 266 may include object information (indicative of a human object, a pallet object, a load stand object, a parcel retainer object, a parcel on a conveyer belt object, a forever bag object, a conveyer belt object, or a small container object, to name few), status information (indicative of a dock/trailer door and trailer door open status, a dock/trailer door and trailer door closed status, a dock/trailer door and trailer door partially open status, a dock/trailer door open but trailer not ready status, or an unloading or loading completed status, to name a few), trailer information, camera device information (such as charging data, camera model, camera video resolution, date/time, or other information derived from a computing device), security-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, other network connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, other data that may be sensed or otherwise detected, data derived based on other data (for example, location data that can be derived from Wi-Fi, cellular network, or IP (internet protocol) address data), calendar items (e.g., deliveries to be made on a particular day), and nearly any other data that may be used to train a machine learning model, as described herein.

The model evaluator 256 may evaluate the accuracy of the machine learning model (e.g., the object-detection ML model 268 and the fill-level ML model 269) trained by the model trainer 254. In some embodiments, the model evaluator 256 is configured to assess the accuracy of the model based on a loss (e.g., error) determined based on the loss function. The model evaluator 256 may validate the machine learning model. In some embodiments, the model evaluator 256 may validate the machine learning model based on training data 266 used for validation purposes instead of training purposes. In some embodiments, the training data used by the model evaluator 256 to validate the machine learning model may correspond to training data different from the training data used by the model trainer 254 to train the machine learning model. In some embodiments, the training data 266 received via the model generating engine 250 from storage 260 may be split into training data used by the model trainer 254 and training data used by the model evaluator 256. In one embodiment, the training data 266 used by the model evaluator 256 may be unlabeled, while the training data 266 used by the model trainer 254 may be labeled.

The model evaluator 256 may validate the machine learning model based on a score function. The score function may facilitate determining probabilistic scores for a classification machine learning model or estimated averages for regression problems, to name a couple examples. It should be understood that the score function may include any suitable algorithm applied to training data 266 to uncover probabilistic insights indicative of the accuracy of the machine learning model. In some embodiments, the model evaluator 256 may employ a score function to determine whether the machine learning model (e.g., the object-detection ML model 268 and the fill-level ML model 269) is at or above a validation threshold value indicative of an acceptable model validation metric. The model validation metric may include a percent accuracy or fit associated with applying the machine learning model trained by the model trainer 254 to the training data 266. If the model evaluator 256 determines that the machine learning model fails to meet the model validation metric, then the model trainer 254 may continue to train the machine learning model. On the other hand, if the model evaluator 256 determines that the machine learning model passes validation, the model deploying engine 258 may deploy the machine learning model, for example, to the user device 102.

In some embodiments, the model deploying engine 258 may receive a machine learning model determined to be sufficiently trained. The model deploying engine 258 may deploy a trained machine learning model to the trailer AI engine 210. As discussed herein, the trailer AI engine 210 may use the trained machine learning model deployed via the model deploying engine 258 to perform the functionality described herein.

The object and fill-level analytics deploying engine 270 may deploy the trailer AI engine 210, its outputs, and/or the machine learning model generated by the model generating engine 250 to any suitable computing device (e.g., user device 102a), via any suitable abstraction layer. For example, the object and fill-level analytics deploying engine 270 may transmit the trailer AI engine 210, its outputs, and/or the machine learning model to the operating system layer, application layer, hardware layer, and so forth, associated with a device, such as the autonomous shifter 120 and/or the autonomous loader 122 of FIG. 1. In one embodiment, the trailer AI engine 210, the model generating engine 250, or any of its components may integrate with an existing software application, such as a work management or scheduling application. For example, the trailer AI engine 210, the model generating engine 250, or any of its components may be installed as a plug-in (for example, a plug-in extension) to a web-based application or browser or the computer productivity application. In this manner, a computing system may present the GUIs depicted at least in FIGS. 3B, 3C, 3E, 3G, 4B, 4C, 4D, 4E, 4F, 4G, 4H, 4I, 5B, 5C, 6B, and 6C.

In the context of the object and fill-level analytics deploying engine 270 transmitting to a computing device the trailer AI engine 210, its outputs, and/or the machine learning model to the operating system layer (e.g., of a user device), analytics may be generated to provide real-time insights into the loading/unloading process. Instead of having to monitor raw footage, an administrator may monitor analytics alongside the raw footage, as illustrated in at least FIGS. 3B and 3C. In some embodiments, the administrator may altogether be omitted, such that the analytics may be deployed to computing devices, such as robots, to automatically complete aspects of the loading/unloading process. Alternatively, the computing device may access the functionality described herein as any suitable software-as-a-service (SaaS) service or by any other means.

Figure 3A:
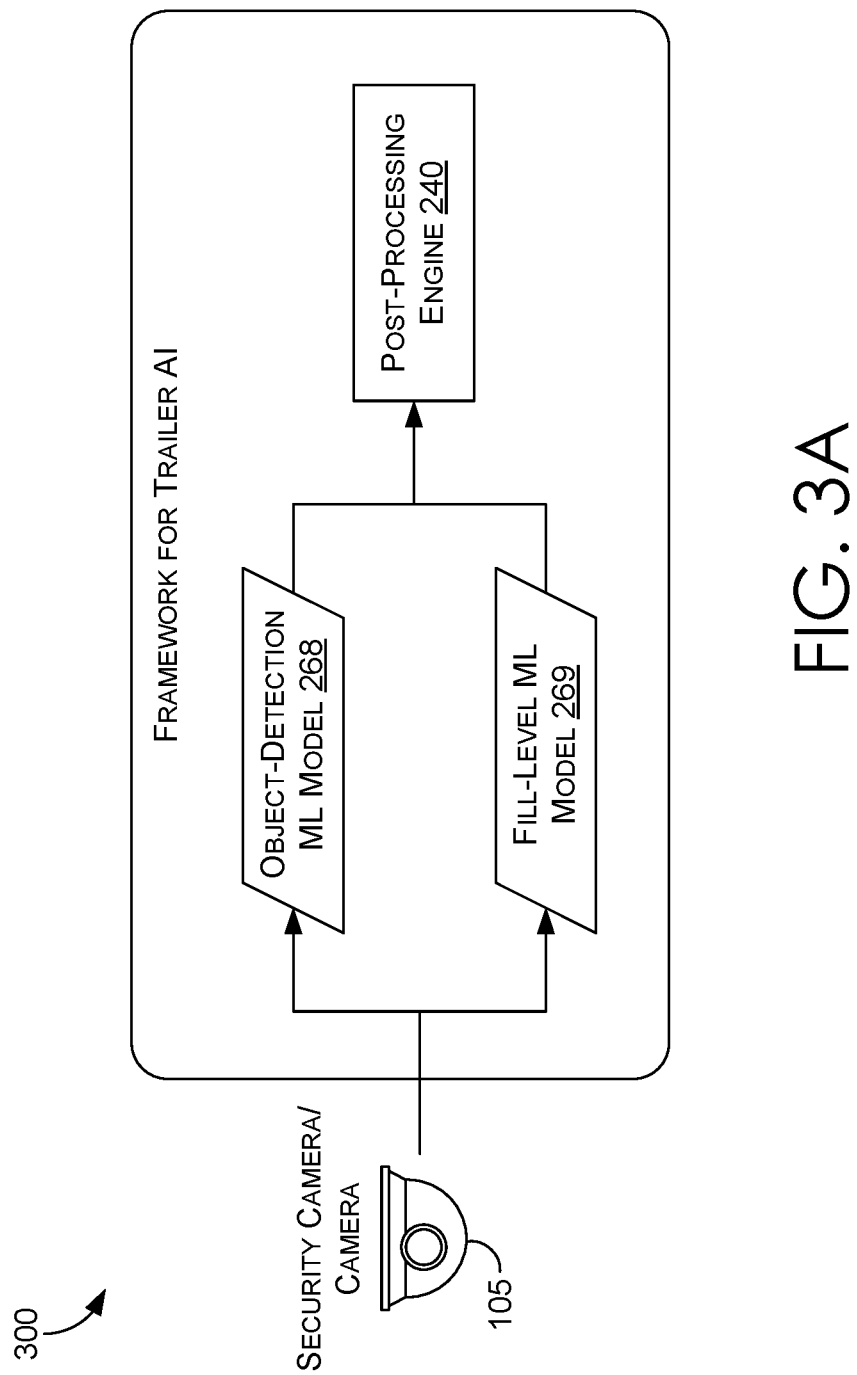
FIG. 3A is a flow diagram of an example process for employing an object-detection machine learning (ML) model and a fill-level ML model on video frames captured by a camera, according to some embodiments of this disclosure.
Figure 3B:
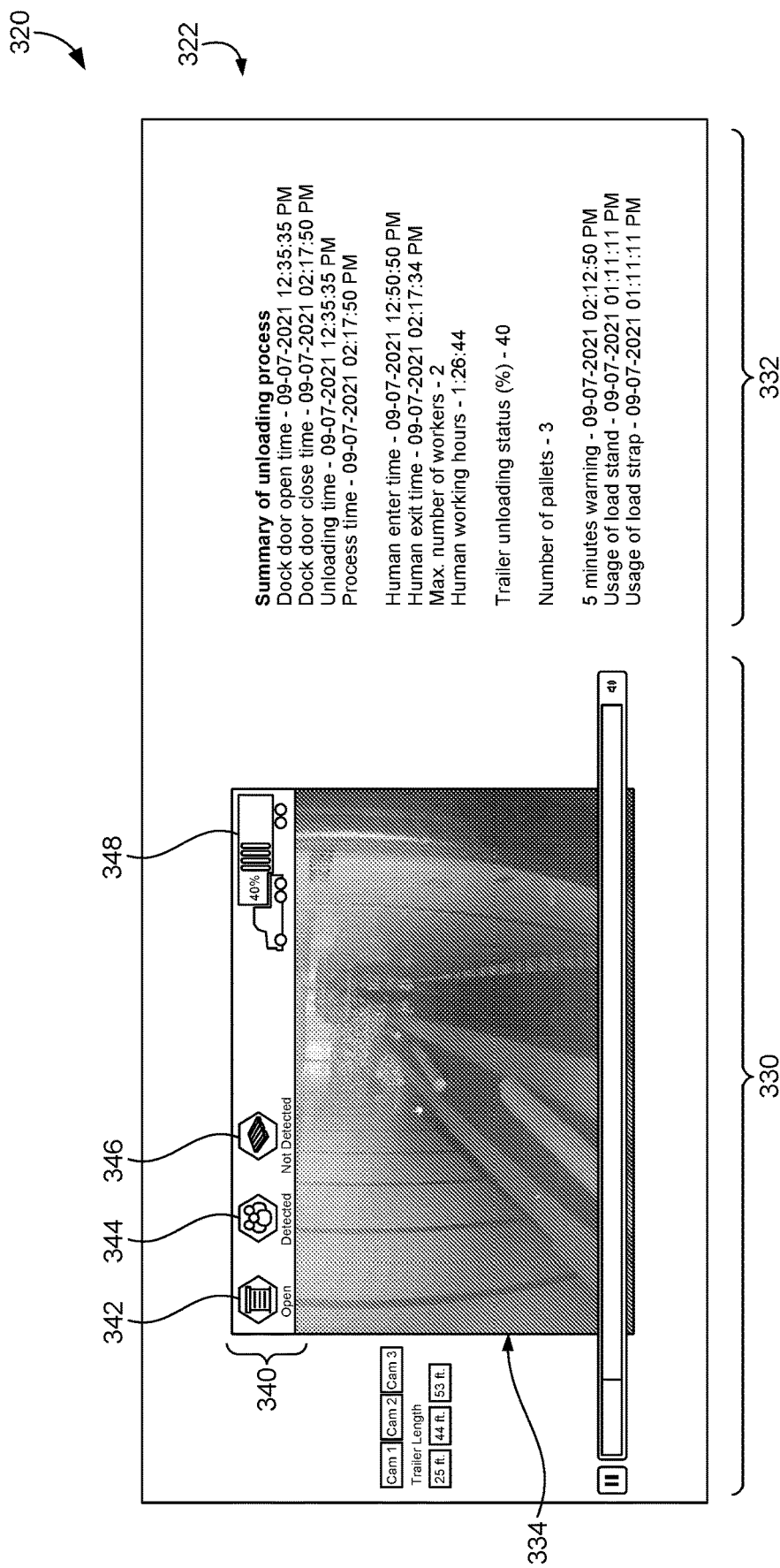
FIG. 3B is a screenshot of an example graphical user interface (GUI) including a stream region and an analytics region, according to some embodiments of this disclosure.
Figure 3C:
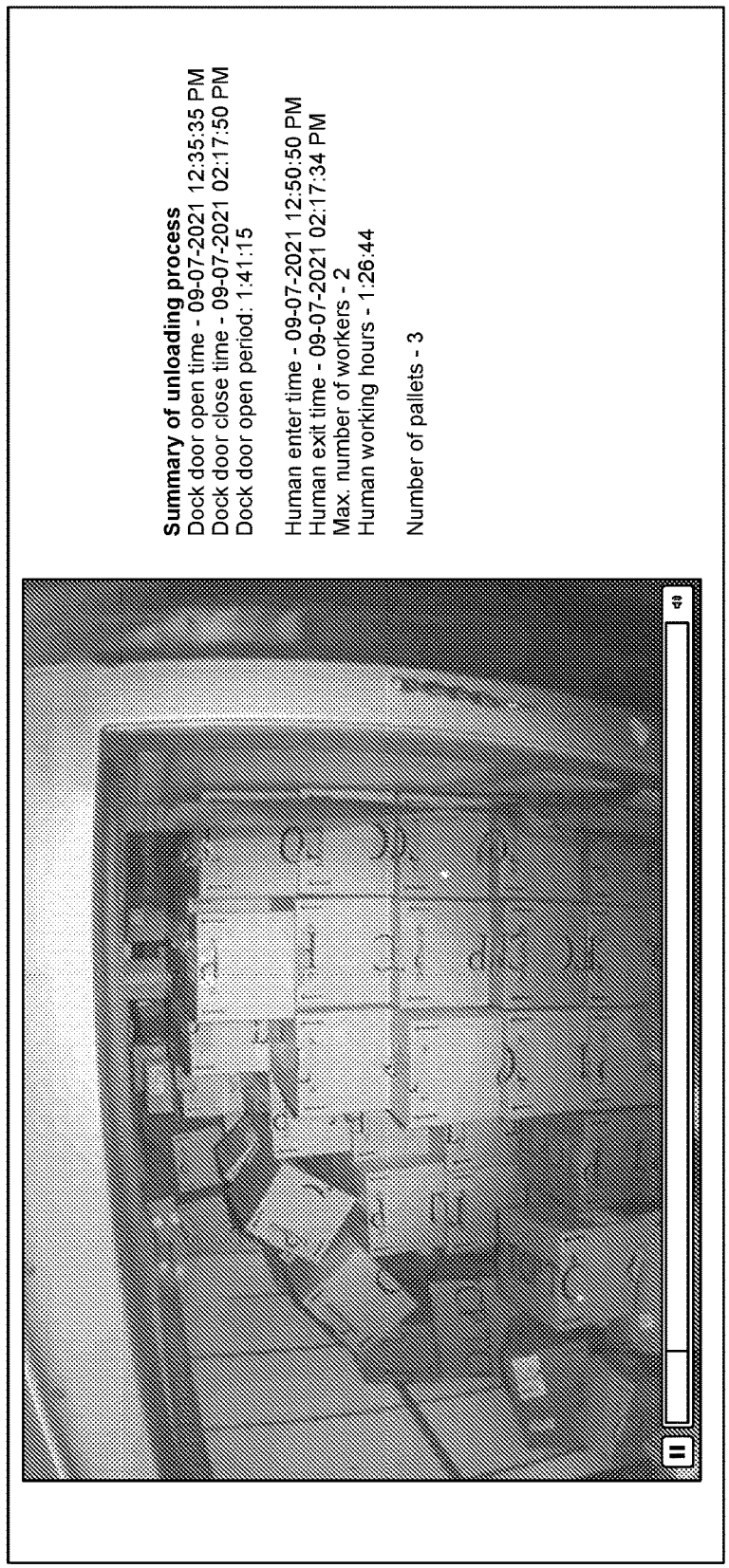
FIG. 3C is a screenshot of an example GUI including a stream region and an analytics region, according to some embodiments of this disclosure.

In one embodiment, the object and fill-level analytics deploying engine 270 may be generally responsible for presenting content and related information, such as the analytics presented on the GUIs illustrated in at least FIG. 3B or 3C. The object and fill-level analytics deploying engine 270 may comprise one or more applications or services on a user device, across multiple user devices, or in the cloud. For example, in one embodiment, presentation component 1116 (FIG. 11) manages the presentation of content to a user across multiple user devices associated with that user. In some embodiments, presentation component 1116 may determine a format in which content is to be presented. In some embodiments, presentation component 1116 generates user interface elements, as described herein. Such user interface elements can include queries, prompts, graphic buttons, sliders, menus, audio prompts, alerts, alarms, vibrations, pop-up windows, notification-bar or status-bar items, in-app notifications, or other similar features for interfacing with a user.

Turning to FIG. 3A, depicted is a flow diagram of an example process 300 for employing the object-detection ML model 268 and the fill-level ML model 269 on video frames from a camera, according to some embodiments of this disclosure. The process 300 may be performed via any component of the operating environment 100 of FIG. 1 and/or the system 200 of FIG. 2 by any suitable component, such as the trailer AI engine 210, for example. As illustrated, process 300 includes a camera 105 capturing a video that is communicated to the object-detection ML model 268 and the fill-level ML model 269 (for example, via the video collector 212 of FIG. 2). At a high level, the object-detection ML model 268 employs the object classification engine 220 to detect, track, and classify objects in video frames of the video stream; and the fill-level ML model 269 employs the fill-level determining engine 230 to predict a fill-level inside a storage compartment, such as a trailer. Outputs of the object-detection ML model 268 and the fill-level ML model 269 may be received by the post-processing engine 240 to generate analytics that are deployed (via the object and fill-level analytics deploying engine 270 of FIG. 2).

Turning to FIGS. 3B and 3C, depicted is a screenshot 320 and 350, respectively, of an example graphical user interface (GUI) 322 including a stream region 330 and an analytics region 332, according to some embodiments of this disclosure. In some embodiments, the GUI 322 may be generated by the trailer AI engine 210 (FIG. 2) and deployed to a user device 102, autonomous shifter 120 (FIG. 1), or autonomous loader 122 (FIG. 1) by the object and fill-level analytics deploying engine 270 (FIG. 2). As illustrated, the stream region 330 may be leftward of the analytics region 332 on the GUI 322. However, it should be understood that the stream region 330 and the analytics region 332 may be positioned in any suitable arrangement, such that the stream region 330 is above or below the analytics region 332, or such that the stream region and the analytics region 332 may be on separate screens.

In some embodiments, the stream region 330 includes a video stream 334 of the video frames captured by a camera 105 (FIG. 1). The video stream 334 may present a (live) video of the inside of the storage compartment at or near-real time. The stream region 330 may include a visual classification indication indicative of the classified object. In this example, the visual classification indication indicates that the object detected is a person, as indicated by text and/or the visually distinct characteristics of the visual classification indication, such as the color, indication pattern, symbol structure, or shape of the visual classification indication. In one embodiment, the visual classification indication may correspond to the classification of the object determined by the object classification engine 220 (FIG. 2).

The stream region 330 may include an information panel 340. Among other visual indications, the information panel 340 may include an open status indicator 342, a person detected status indicator 344, a parcel detected status indication 346, and a fill-level indicator 348. The open status indicator 342 may provide an indication of whether the door to storage compartment is open or closed. The person detected status indicator 344 may provide of indication of whether a person has been detected in the storage compartment, for example, by the object classification engine 220 (FIG. 2). The fill-level indicator 348 may provide an indication of how full the storage compartment is. For example, the fill-level determining engine 230 (FIG. 2) may predict the fill-level of the storage compartment. In some embodiments, the fill-level indicator 348 may be expressed as a percentage (e.g., percent full), fraction (¼, ⅓, ½, and so forth), a time to completion of the loading (to 100%) or unloading (to 0% full), or any other visual indication, icon, or symbol. However, it should be understood that the information panel 340 may be omitted, as shown in FIG. 3C.

The analytics region 332 may include alphanumeric characters indicative of analytics determined by the trailer AI engine 210 (FIG. 2). As illustrated, the analytics region 332 may provide information indicative of the dock/trailer door open time, the dock/trailer door close time, the unloading time (e.g., time taken to complete the load/unload process), the process time, the human enter time, the human exit time, the maximum number of workers, the human working hours, the trailer unloading status (e.g., percent complete of the loading/unloading process), a five minute warning, the usage of load stand, the usage of load straps, and so forth. In some embodiments, the information presented on the analytics region 332 may be communicated to the autonomous shifter 120 and autonomous loader 122 (FIG. 1).

Figure 3D:
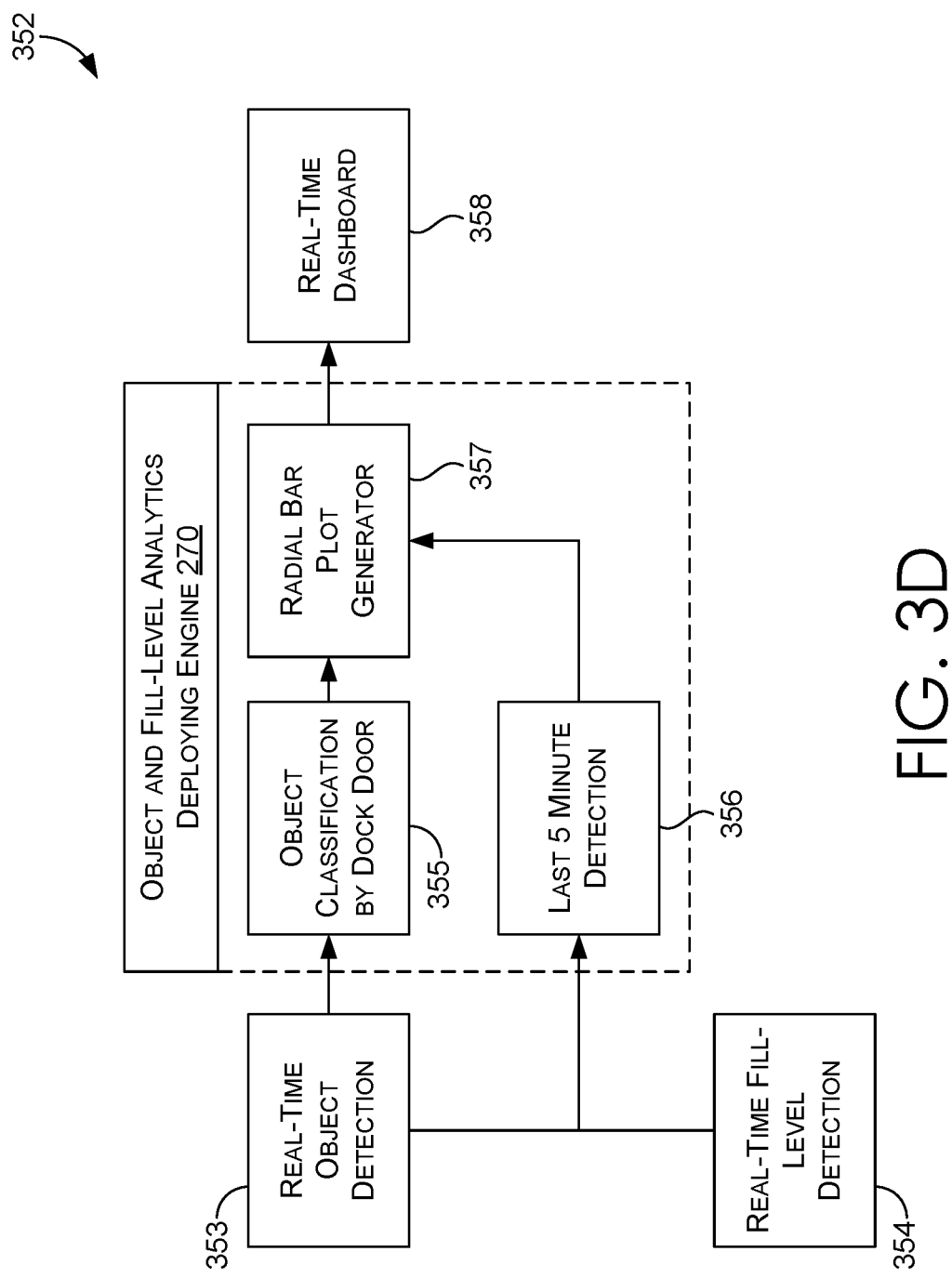
FIG. 3D is a flow diagram of an example process for employing an object and fill-level analytics deploying engine on outputs of an object-detection ML model and a fill-level ML model, according to some embodiments of this disclosure.

FIG. 3D is a flow diagram of an example process 352 for employing an object and fill-level analytics deploying engine 270 on outputs (block 508) of an object-detection ML model 268 and a fill-level ML model 269, according to some embodiments of this disclosure. In one embodiment, the real-time object detection outputs (block 353) are classified (block 355) into their corresponding detection class and post processed for each trailer/dock door. This data may be used to generate (block 357) the radial bar plot and color code the dock door labels based on the detection results. The radial bar plot (e.g., the radial bar plot 359 of FIG. 3E) may be updated at or near real-time to generate a real-time dashboard (block 358). In one embodiment, the real time fill-level detection (block 354) and object detection outputs (block 353) are combined to generate last 5-minute notification (block 356) of the unloading process. Although discussed in the context of a 5-minute notification, a notification indicative of any suitable timing other than 5-minute may be generated. In this example, the 5 minute notification allows for the prediction and display of a state during unloading process based on the detection results. The prediction may be generated with any suitable model(s) such as the mean/median of a distribution or a more complex machine learning model such as decision tree, random forest, or the like. For example, distribution of the fill-level percentage 5 minutes before the end of each unloading process may be used to find the median fill-level percentage that represents 5 minutes before the end of each unloading process. When the fill-level of a dock door drops below this threshold, the 5-minute notification (block 356) may be generated. Alternatively, a more complex 5-minute classification model may be created by fitting the object count and fill-level trajectory data with true false labels that represent whether the process have less than or more than 5 minutes less.

Figure 3E:
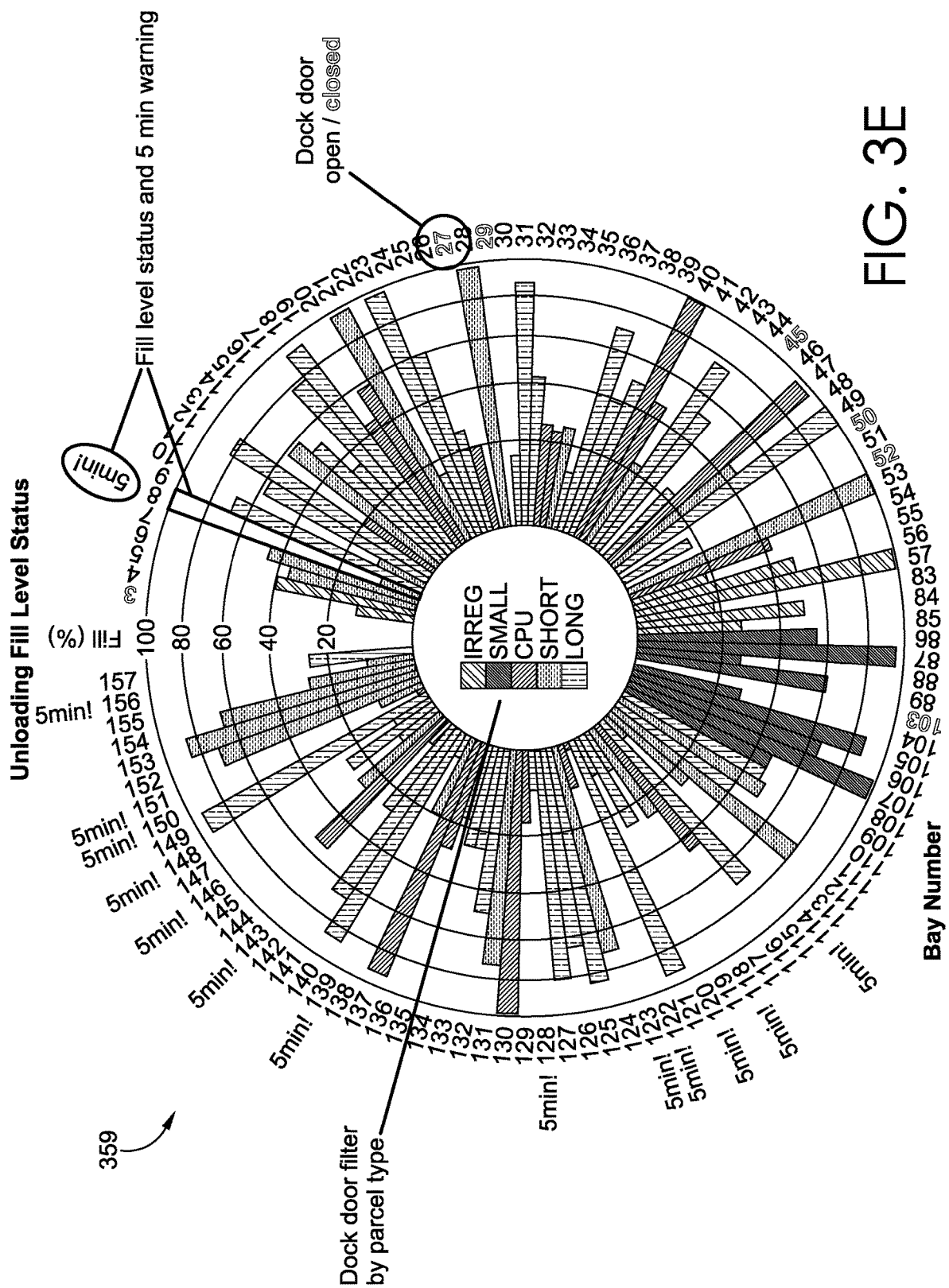
FIG. 3E is a screenshot of an example GUI generated by an object and fill-level analytics deploying engine, according to some embodiments of this disclosure.

FIG. 3E is a screenshot of an example GUI, that includes a radial bar plot 359, generated by an object and fill-level analytics deploying engine 270, according to some embodiments of this disclosure. In one embodiment, the radial bar plot 359 is generated based on process 352 of FIG. 3D. In some embodiments, the trailer AI engine 210 improves the visibility of loading/unloading status of a facility. Real-time object detection (block 353) and real-time fill-level detection (block 354) may better achieve this goal by digitizing the loading/unloading status of each dock door. However, if the digitized data is displayed for each dock door separately, the visibility is limited to each dock door and does not provide a comparison of all dock doors. The trailer AI engine 210 may further improve the visibility by summarizing the detected results in a radial bar plot 359, as illustrated in FIG. 3E. As illustrated, the radial bar plot 359 may provide all the trailer/dock door statuses in a single view. Illustrating a detected object, such as the fill-level, may be difficult with rectangular bar plots due to limited space for displaying many dock doors on a single axis. The radial display, such as that shown in FIG. 3E, can show the status of detected objects for larger number of trailer/dock doors with enough space for each trailer/dock door label to be displayed at a visible font size. With the radial bar plot 359 the trailer/dock doors may be further grouped based on bar color, dock door label color, and additional texts beside the labels. In this example, the bar colors represent unload parcel types (e.g., IRREG, SMALL, CPU, SHORT, and LONG), the trailer/dock door label colors represent the trailer/dock door status (dock door open is indicated as color green otherwise in gray), and the additional texts beside the labels notify unloading processes with 5 minutes left. The radial presentation also allows the additional text to be displayed in visible font size, just like the dock door labels. This allows the dock doors that need attention to be quickly illustrated in a limited space.

Figure 3F:
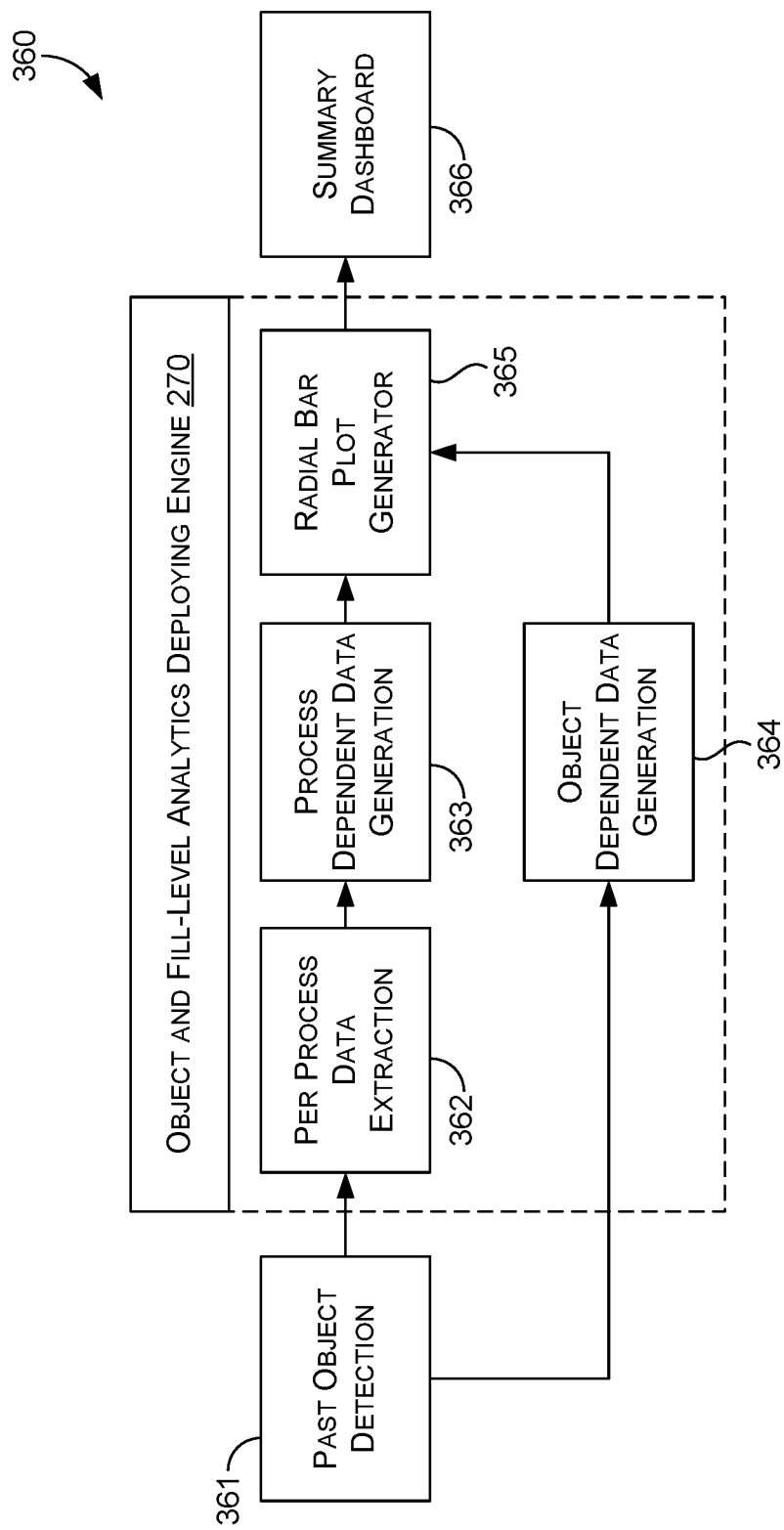
FIG. 3F is a flow diagram of an example process for employing an object and fill-level analytics deploying engine on outputs of an object-detection ML model, according to some embodiments of this disclosure.

FIG. 3F is a flow diagram of an example process 360 for employing an object and fill-level analytics deploying engine 270 on outputs of an object-detection ML model 268, according to some embodiments of this disclosure. As illustrated, the past object detection outputs (block 361) may be used to extract (block 362) process dependent data. Example process dependent data that may be generated (block 363) based on the extraction includes a start time and an end time of each process, idle time, active time, or similar. A process may refer to when both the trailer/dock door open and close. Active time may refer to the time when people and unloading parcels are detected. Idle time may refer to when the doors are open, but the unloading process is at a stop (no progress made). The past object detection outputs (block 361) may also be used to generate (block 364) object dependent data, that may perform calculations and/or predictions without a start and end of each process and characterizes the status of each trailer/dock door at a given time range. These data may include average number of people, average parcel flow rate, or similar. In one embodiment, the process and object dependent data (blocks 363 and 364) are combined to generate (block 365) various radial bar plot, such as the radial bar plot 370 of FIG. 3G, to summarize the overall performance of a loading/unloading facility on a summary dashboard 366.

Figure 3G:
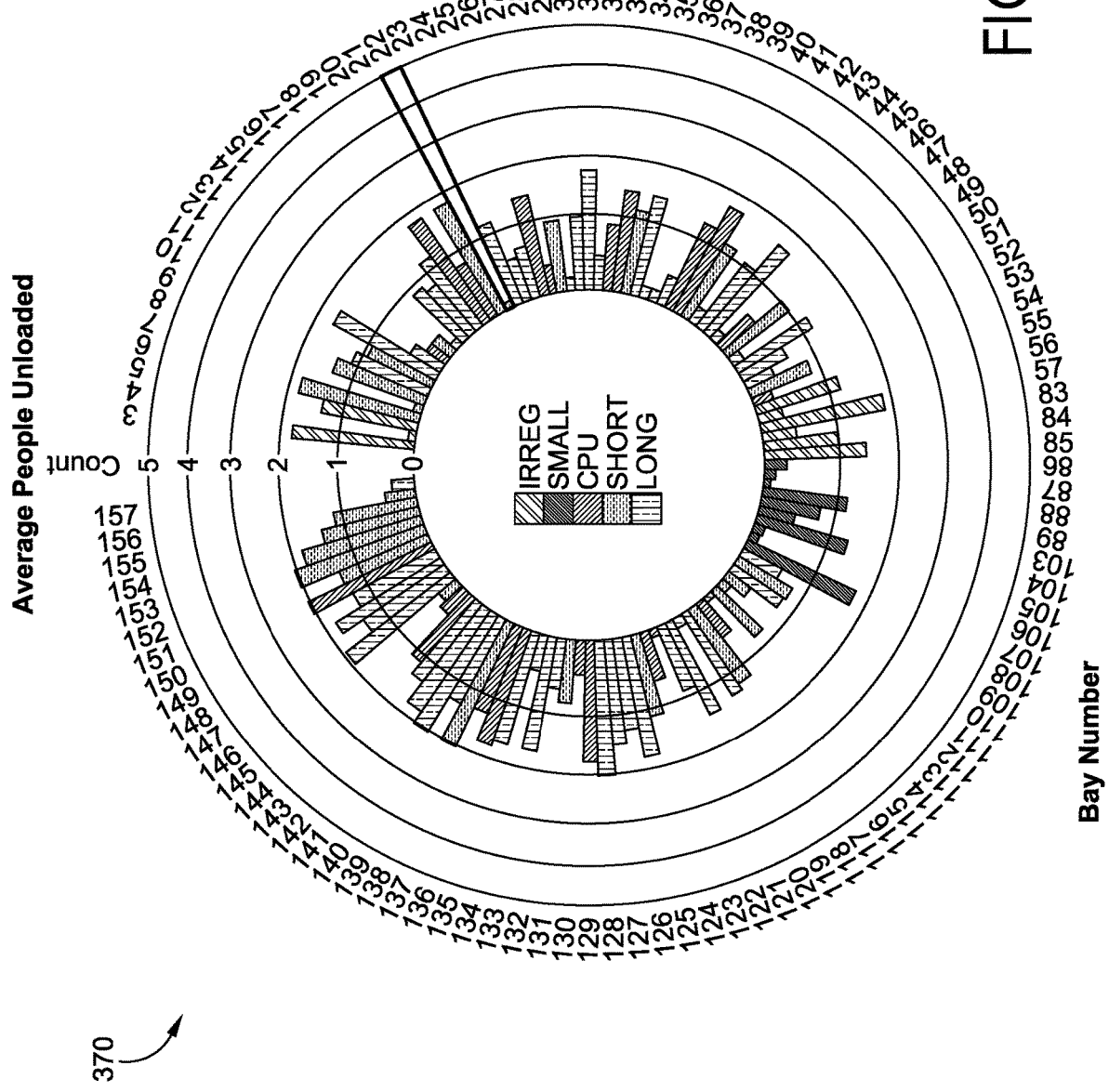
FIG. 3G is a screenshot of an example GUI generated by an object and fill-level analytics deploying engine, according to some embodiments of this disclosure.

FIG. 3G is a screenshot of an example GUI, including a radial bar plot 370, generated by an object and fill-level analytics deploying engine 270, according to some embodiments of this disclosure. The radial bar plot 370 may show the summary of the loading/unloading status of each trailer/dock door. As illustrated, when a range of dates are selected, the radial bar plot 370 may be updated to show statistical characteristic (such as minimum, maximum, mode, average, or median) of each detected objects.

Figure 4A:
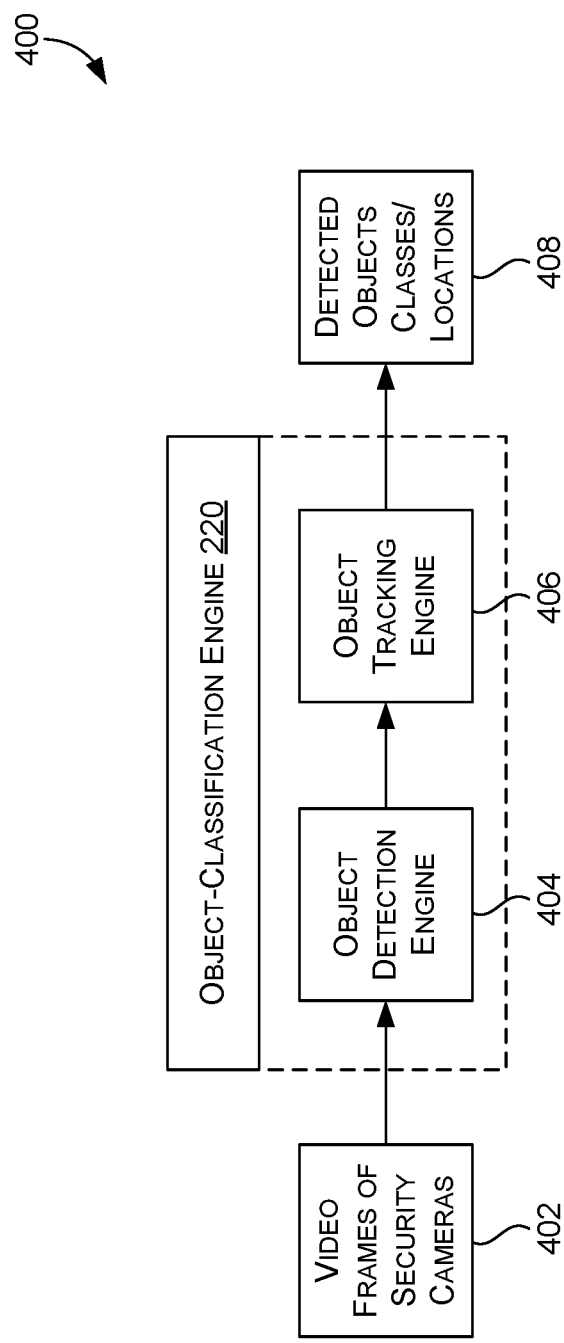
FIG. 4A is a flow diagram of an example process for detecting, tracking, and classifying objects from video frames captured by a camera, according to some embodiments of this disclosure.

Turning to FIG. 4A, depicted is a flow diagram of an example process 400 for detecting, tracking, and classifying objects from video frames captured by a camera 105 (FIG. 1), according to some embodiments of this disclosure. In some embodiments, the object classification engine 220 (FIG. 2) receives video frames 402 from cameras of the storage compartment. In some embodiment, the camera may correspond to security cameras that are already installed and operating within the storage compartment.

In some embodiments, the object classification engine 220 (FIG. 2) includes an object detection engine 404 and an object tracking engine 406. The object detection engine 404 may detect objects in the video frames 402. The object detection engine 404 may include one or more deep learning-based models. For example, the object detection engine 404 may include at least one model that employs a YOLO model methodology, an SSD methodology, a Faster-RCNN methodology, or any suitable model that may detect multiple objects in different classes, locations, and scales. The object detection engine 404 may be trained by the model generating engine 250 (FIG. 2). For example, the object detection engine 404 may be continuously trained using images and/or videos collected from various trailer loading/unloading scenarios. In this manner, the object detection engine may produce more accurate results under changing loading/unloading environments such as changing of the lighting conditions of a loading/unloading environment, different loading/unloading background textures, and the like. The object detection engine 404 may receive image/video frames 402 from the cameras via data streaming. In this manner, the object detection engine 404 may produce pre-defined object classes with their locations indicated by bounding boxes.

To account for discontinuous of object detection results from the object detection engine 404, for example, due to the poor light conditions of the loading/unloading environment and low image resolution of certain cameras (e.g., monocular security cameras), especially for those inside of a storage compartment, the object classification engine 220 (FIG. 2) may include an object tracking engine 406. The object tracking engine 406 may compare and record the bounding box locations of those detected objects from the previous and current image/video frames 402. In some embodiments, the object tracking engine 406 may process the coordinates of objects detected bounding boxes from the previous frames, using a Kalman filter, to predict their trajectories and associate with the detection from the current video frame for matching. For example, the object tracking engine 406 may compare the position of the detected object in the current video frame with a predicted position (predicted by the Kalman filter) to determine differences between the positions. In some embodiments, newly detected objects (detected by object detection engine 404) that move into the current frame may be added to a birth memory array for future tracking, and the objects that move out of the current frame may be moved to the death memory array. Thereafter, the objects that have been identified, tracked, and classified may be output (block 408) by the object classification engine 220 (FIG. 2).

Figure 4B:
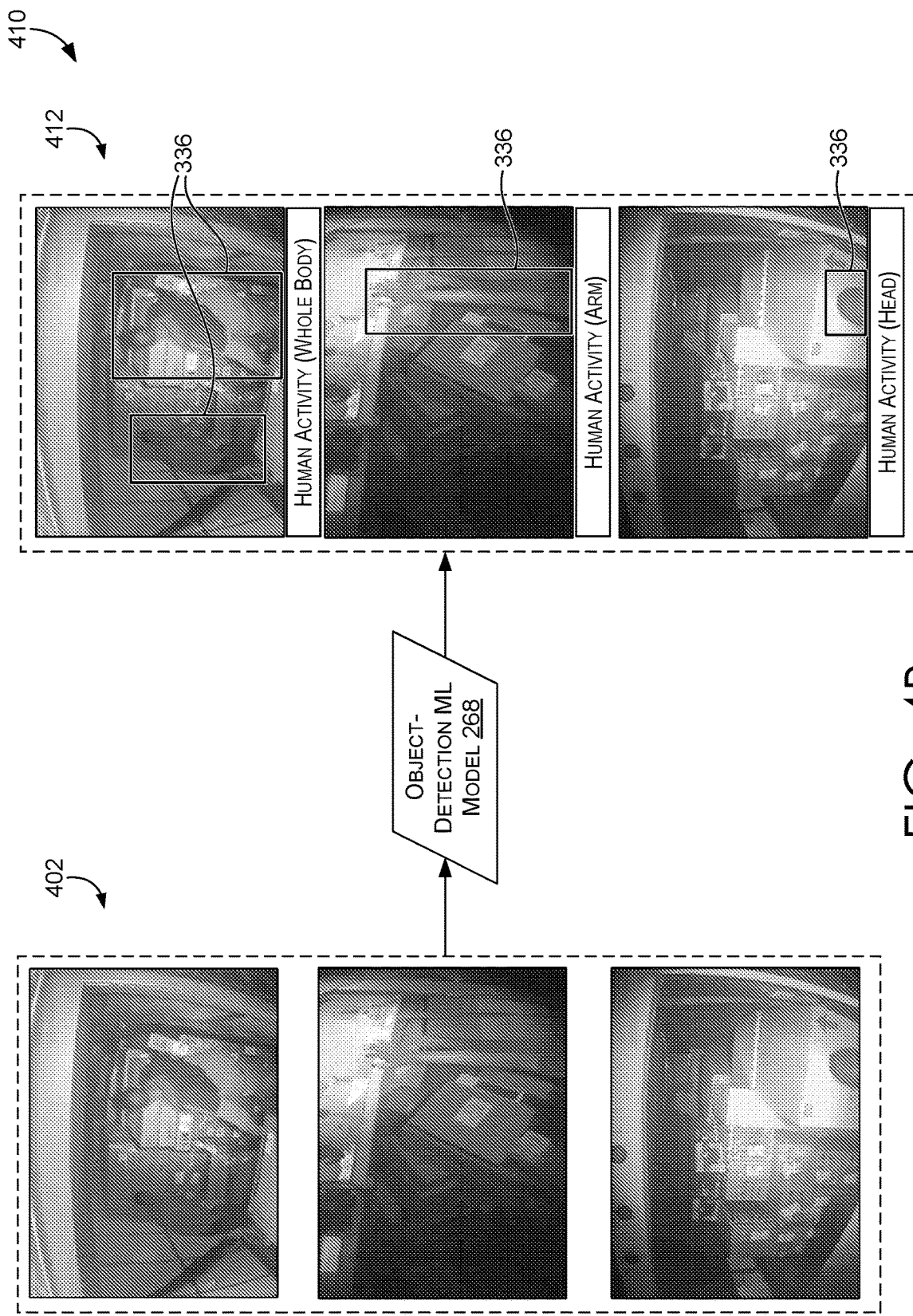
FIG. 4B is a flow diagram of an example process of an object-detection ML model being applied to detect objects in video frames, according to some embodiments of this disclosure.

Turning to FIG. 4B, depicted is a flow diagram of an example process 410 of an object-detection ML model 268 (FIG. 2) being applied by an object classification engine 220 (FIG. 2) to detect objects in video frames 402, according to some embodiments of this disclosure. In this example, three separate video frames 402 may be provided to the object-detection ML model 268. In response to employing aspects of the object classification engine 220, the objects in classified video frames 412 may be identified, tracked, and classified. As illustrated, the classified video frames 412 include the illustrated visual classification indications 336 (e.g., symbol) on each identified object. When the object disappears, the corresponding visually classification indication 336 may be omitted or removed. In this example, the visual classification indications 336 includes a box border around the identified objects. As illustrated, the object detection ML model 268 may identify a person (e.g., an entire contour of a person's body) or a portion of a person (e.g., a body part, such as an arm or head).

In some embodiments, the object detection ML model 268 may detect the appearance of a human object at a dock/trailer door or inside a storage compartment based on images/videos streaming from an on-site security camera. Based on the video data, the object detection ML model 268 may determine a number of on-site humans and corresponding positions of these detected human objects. The information about the number of workers can help the operation manager understand if the current process has enough workers or not. In this manner, a monitor/manager can adjust the size of the on-site loading/unloading team to improve the process quality and efficiency, as well as to maintain efficiency and flexibility of the loading/unloading process. On the other hand, the location of the detected human objects may also be utilized for executing enterprise compliance-related operations like determining when to close or open a dock-door.

As discussed above, the embodiments discussed herein are not limited to human object detection, and may be applied to detect, track, and classify other objects such as load stand, parcel retainer, or pallet that may appear during the loading/unloading process. Moreover, embodiments discussed herein may detect if any of these objects were captured by the security cameras in a video/image frame. By employing the object-detection ML model 268, the quantity and location of pallets, load stands, or parcel retainers may be detected in real-time through bounding boxes. These detection results can help teams keep track of how many of these objects are inside a trailer and how many of them need to be removed when a loading/unloading process is completed.

Figure 4C:
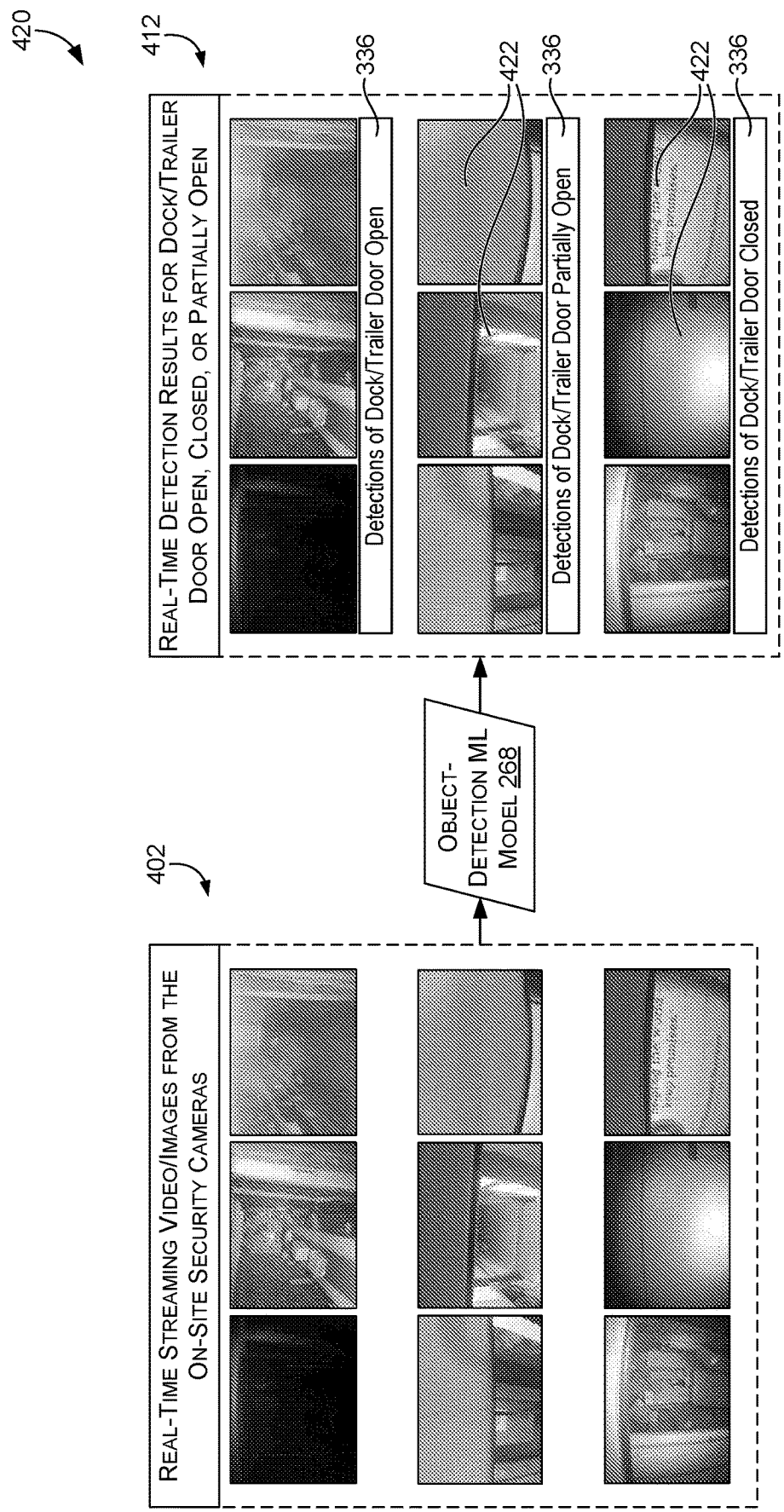
FIG. 4C is a flow diagram of an example process of an object-detection ML model being applied to detect a status associated with a video frame, according to some embodiments of this disclosure.

FIG. 4C is a flow diagram of an example process 420 of an object-detection ML model 268 (FIG. 2) being applied by an object classification engine 220 (FIG. 2) to detect a status of a video frame 402 based on detection of an object, such as a dock/trailer door 422, in video frames 402. In some embodiments, the camera 105 (FIG. 1) may be positioned external to the storage compartment relative to the dock door 422, so that the camera 105 may capture video of the dock/trailer door 422 being closed or open. In this example, three separate video frames 402 may be provided to the object-detection ML model 268. In response to employing aspects of the object classification engine 220, the objects in classified video frames 412 may be identified, tracked, and classified. As illustrated, the classified video frames 412 include the illustrated visual classification indications 336 on each identified object. In this example, the visual classification indications 336 includes a text box proximate to the video frame to provide a description of whether a dock/trailer door 422 has been detected. As illustrated, the object detection ML model 268 may determine whether the dock/trailer door 422 is open, partially opened, or closed. By tracking the status of the dock/trailer door 422, the evaluation of the start and/or end of a loading/unloading process may improve through the increased situational awareness of the loading/unloading environment. In one embodiment, the object detection ML model 268 can detect/identify different status for the dock/trailer door 422, such as: dock/trailer door open, dock/trailer door partially open, and dock/trailer door closed.

First, the object and fill-level analytics deploying engine 270 (FIG. 2) may communicate that status of the dock/trailer door 422 is open to allow the loading/unloading operators to be aware that a dock/trailer door 422 is opened, and a loading/unloading process is expected to start. The dock/trailer door 422 open status may be communicated to the autonomous shifter 120 and/or the autonomous loader 122 (FIG. 1) to automate start of the loading/unloading process. In one embodiment, the dock/trailer door 422 open status may be received by the trailer AI engine 210 (FIG. 2) to begin the object detection process, using object-detection ML model 268 (FIG. 2), to initiate the detection procedure for detecting/tracking human objects, pallets, fill-levels, or the other objects in the trailer loading/unloading environment.

Second, the object and fill-level analytics deploying engine 270 (FIG. 2) may communicate the status of the dock/trailer door 422 being in a closed status to allow operators to be aware that a dock/trailer door 422 is closed, and the loading/unloading process has ended. Similarly, the status that the dock/trailer door 422 is closed may be communicated to the autonomous shifter 120 and/or the autonomous loader 122 (FIG. 1) to automate ending the loading/unloading process. In some embodiments, the time between a pair of door-open and door-close events can be used for process time estimation of a complete loading/unloading session.

Third, the object and fill-level analytics deploying engine 270 (FIG. 2) may communicate that the dock/trailer door 422 as being partially opened (e.g., the third dock/trailer door is between dock/trailer door open and closed statuses). Dock/trailer door 422 partially open can be automatically communicated (e.g., in the form of an alert or electronic message) to the operation team to take some action if the dock/trailer door is not closed after a loading/unloading process or open during the loading/unloading process. In some embodiments, during an loading/unloading process, a partially opened dock/trailer door 422 may obstruct the view of the camera 105 (FIG. 1) and reduce the amount of content captured by the camera 105, making it difficult for the object-detection ML model 268 (FIG. 2) to track and detect features of the video that may be used to determine a fill-level, number of humans, number of pallets, and the like. Based on the dock/trailer door 422 partial open status, the autonomous shifter 120 and/or the autonomous loader 122 (FIG. 1) can take action to remove the blockage from camera view, prevent unauthorized entry, and the like.

Figure 4D:
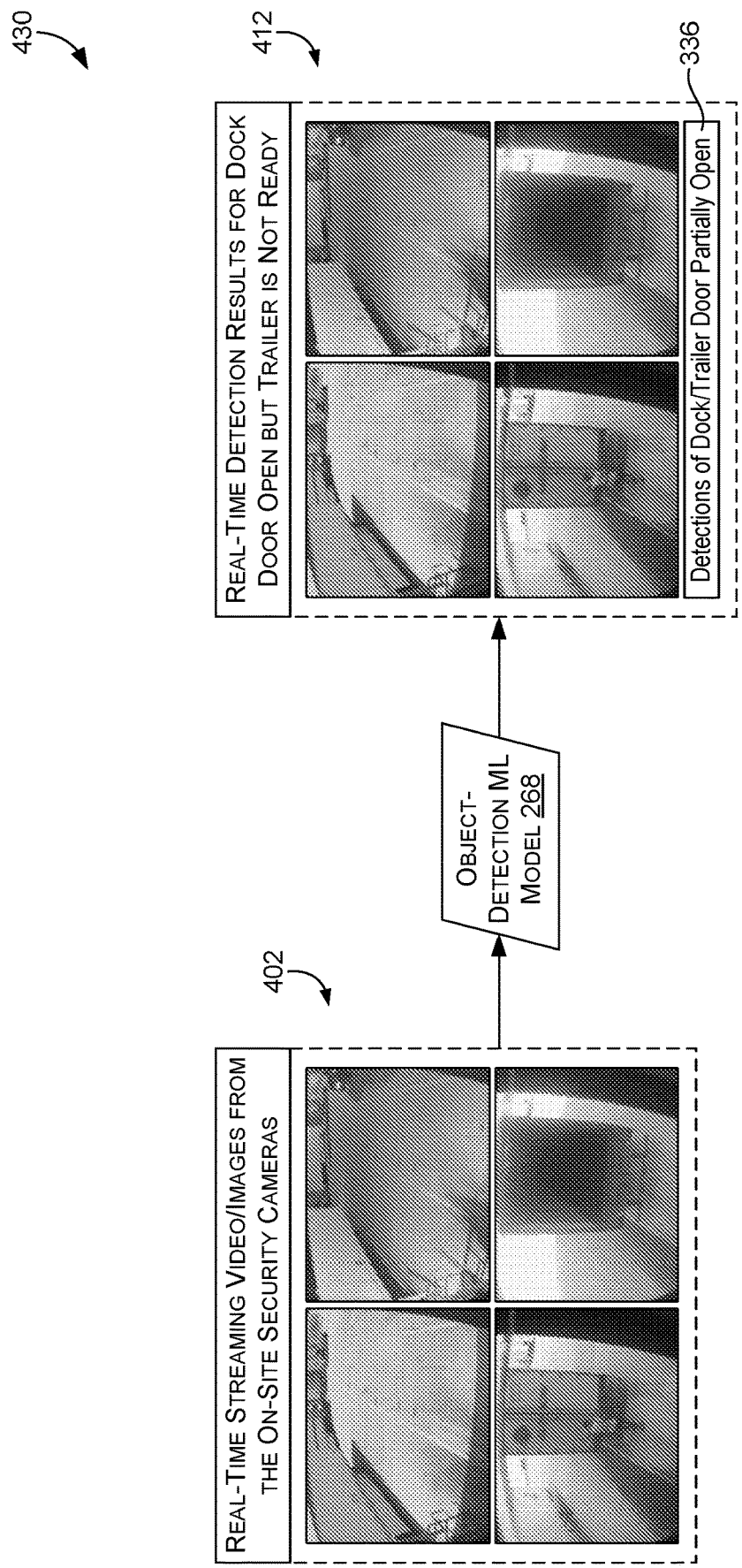
FIG. 4D is a flow diagram of an example process of an object-detection ML model being applied to detect a status associated with a video frame, according to some embodiments of this disclosure.

FIG. 4D is a flow diagram of an example process 430 of an object-detection ML model 268 (FIG. 2) being applied by an object classification engine 220 (FIG. 2) to detect a status associated with a video frame 402, according to some embodiments of this disclosure. In this example, the status indicates that the dock/trailer door 422 (FIG. 4C) is open but the trailer is not ready. As illustrated, four separate video frames 402 may be provided to the object-detection ML model 268. In response to employing aspects of the object classification engine 220, the objects in classified video frames 412 may be identified, tracked, and classified. As illustrated, the classified video frame include the illustrated visual classification indications 336. In this example, the visual classification indications 336 includes a text box proximate to the video frame to provide a description of whether a loading/unloading process has been completed.

This status indicative of the "dock/trailer door being open but the trailer not being ready" may result when in-bound dock/trailer doors are left open and unattended with no trailer on the other side, or the trailer is not parked at the dock/trailer door. These occurrences may slow down the loading/unloading process. To prevent any inefficiencies related event from happening, the object-detection ML model 268 (FIG. 2) may provide detection of dock/trailer door status, door open but trailer is not ready. In some embodiment, whenever the object-detection ML model 268 detects that a trailer/dock door 422 is open but trailer is not ready is detected, the object-detection ML model 268 may cause a message to automatically be sent to the operation team so the team can respond by sending a task force to secure the dock/trailer door and follow up the on-site situation. Alternatively or additionally, whenever the object-detection ML model 268 detects that a trailer/dock door 422 is open but trailer is not ready is detected, the object-detection ML model 268 may cause a control signal to automatically be sent to the autonomous shifter 120 and/or the autonomous loader 122 (FIG. 1) to instruct the autonomous shifter 120 and/or the autonomous loader 122 to automatically secure the dock/trailer door.

Figure 4E:
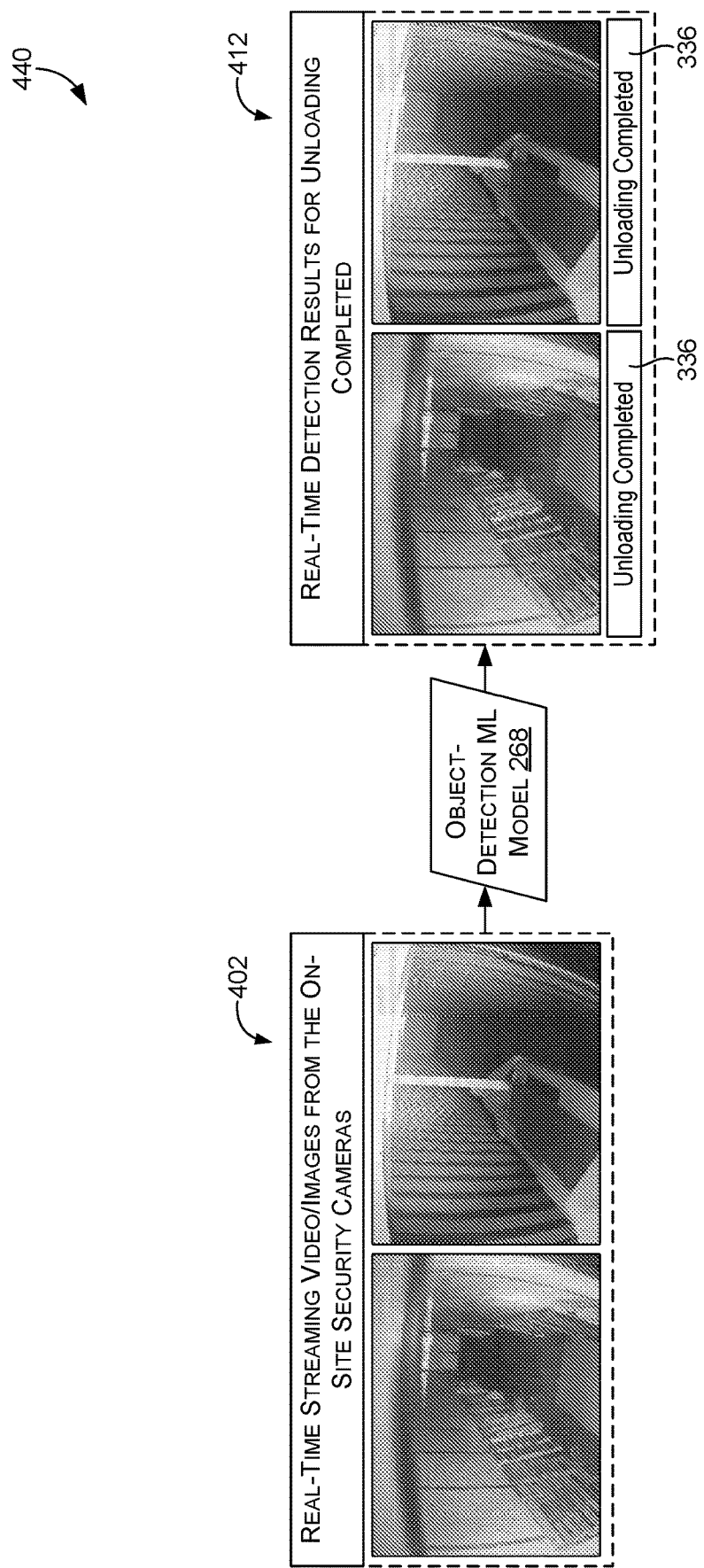
FIG. 4E is a flow diagram of an example process of an object-detection ML model being applied to detect a status associated with a video frame, according to some embodiments of this disclosure.

Turning to FIG. 4E, depicted is a flow diagram of an example process 440 of an object-detection ML model 268 (FIG. 2) being applied by an object classification engine 220 (FIG. 2) to detect a status associated with a video frame 402, according to some embodiments of this disclosure. In this example, the status indicates that the loading/unloading process is complete. As illustrated, two separate video frames 402 may be provided to the object-detection ML model 268. In response to employing aspects of the object classification engine 220, no objects (or stacked/empty pallets) in classified video frames 412 may be identified, such that the object classification engine 220 may determine that the unloading process is complete. As illustrated, the classified video frames 412 include the illustrated visual classification indications 336. In this example, the visual classification indications 336 includes a text box proximate to the video frame to provide a description that the loading/unloading process has been completed.

In some embodiments, a completed loading/unloading process is detected (by the object classification engine 220) if there were no packages stacked on one another and the fill-level is or is almost zero (e.g., less than 5%). The object classification engine 220 may record the time when the loading/unloading process has been completed, and calculate the time spent before the dock/trailer door is closed. By determining this status, present embodiments can improve the operational efficiency by highlighting a completed process, promoting the loading/unloading team to quickly wrap up the trailer, close the dock/trailer door, and rotate to the next trailer for another new loading/unloading task.

Turning to FIG. 4F, depicted is a flow diagram of an example process 460 of an object-detection ML model 268 (FIG. 2) being applied by an object classification engine 220 (FIG. 2) to detect objects, such as the illustrated parcels, in video frames 402, according to some embodiments of this disclosure. In this example, a video frame 402 may be provided to the object-detection ML model 268. In response to employing aspects of the object classification engine 220, the object in classified video frames 412 may be identified, tracked, and classified. As illustrated, the classified video frame include the illustrated visual classification indications 336 on each identified object. In this example, the visual classification indications 336 includes a box border around the identified objects. As illustrated, the object detection ML model 268 may identify and classify a parcel (e.g., a box of an item for shipment). As illustrated, the object detection ML model 268 may track movement of the parcel on a conveyer belt 462.

By tracking parcels on the conveyer belt, the object-detection ML model 268 may better estimate the loading/unloading efficiency from different loading/unloading teams. The time stamps of the generation/removal of a bounding box for a detected parcel on the conveyer belt can be recorded and the number of loaded/unloaded parcels per time unit can be calculated using the tracking capability of object classification engine 220. In this manner, the object classification engine 220 can provide an analysis of a loading/unloading efficiency under various trailer conditions. Additionally, the object classification engine 220 can detect, classify, and track the conveyor belt inside the storage compartment by the proposed object detection framework via a polygon-shape as shown in FIG. 4G.

In more detail, turning to FIG. 4G, depicted is a flow diagram of an example process 470 of an object-detection ML model 268 (FIG. 2) being applied by an object classification engine 220 (FIG. 2) to detect an object, such as the conveyer belt 462, in video frames 402, according to some embodiments of this disclosure. In this example, a video frame 402 may be provided to the object-detection ML model 268. In response to employing aspects of the object classification engine 220, the object in classified video frames 412 may be identified, tracked, and classified. As illustrated, the classified video frame 412 includes the illustrated visual classification indications 336 on each identified object. In this example, the visual classification indications 336 includes a box border (e.g., polygon 472) around the identified object. As illustrated, the object detection ML model 268 may identify and classify a conveyer belt 462. The conveyer belt 462 may be determined based on identification of a polygon 472. The detected conveyer belt 462 with pixel coordinates from the four corner points of the polygon 472 can further be used to determine whether the parcels are on the conveyer belt 462 or are omitted from (e.g., not on) the conveyer belt 462.

Figure 4H:
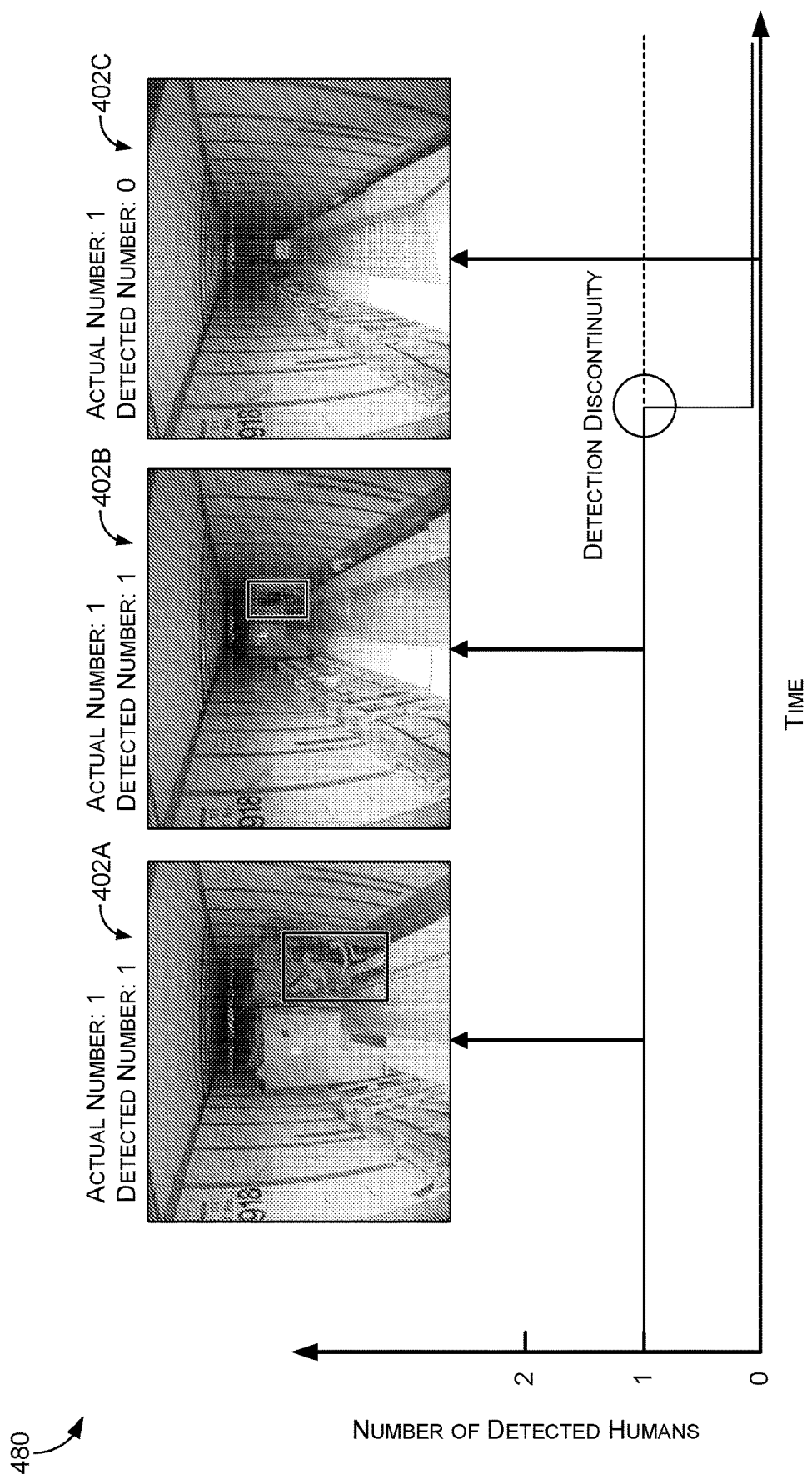
FIG. 4H is a graph diagram of a time graph of results of an object-detection ML model being applied to determine objects in video frames, according to some embodiments of this disclosure.
Figure 4I:
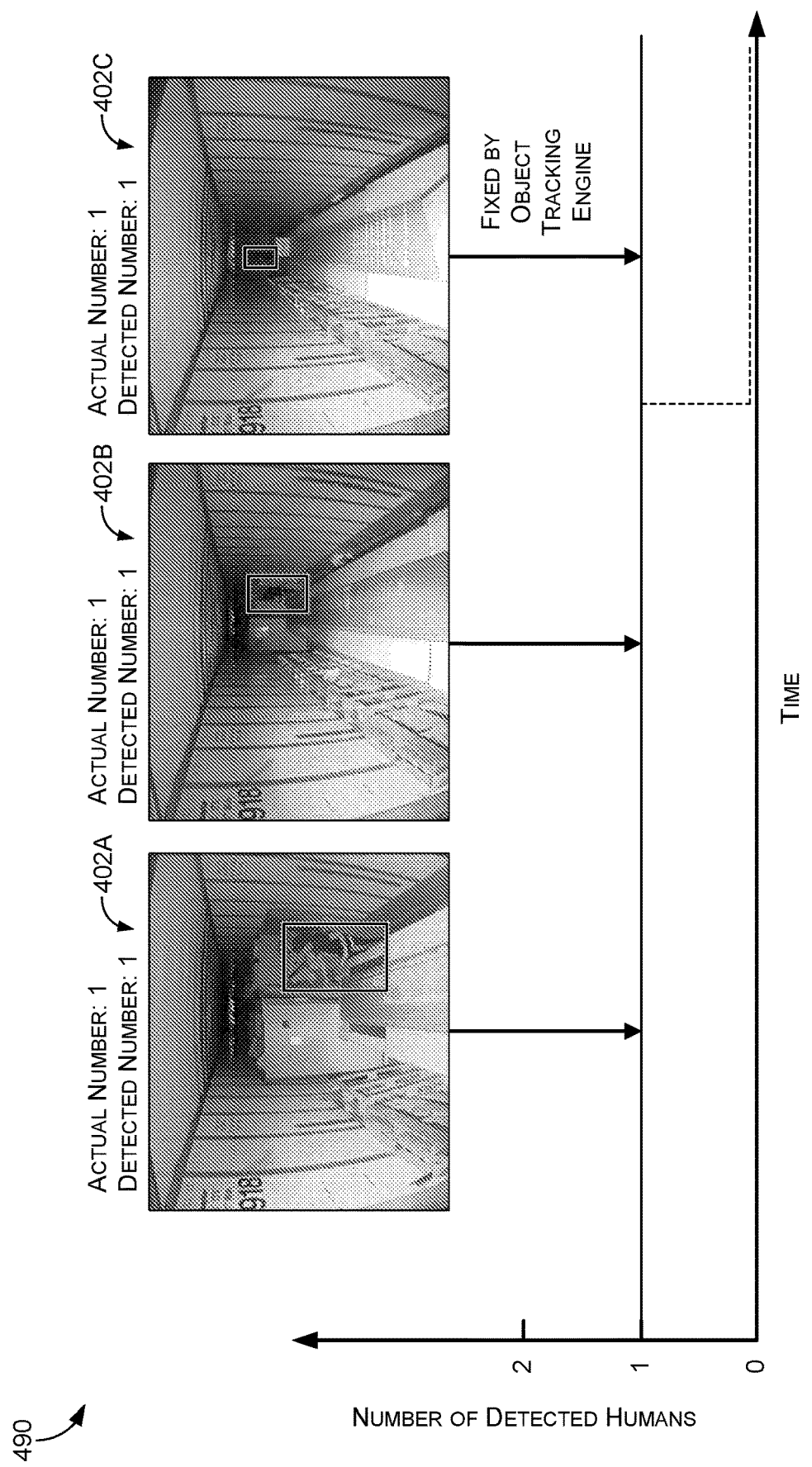
FIG. 4I is a graph diagram of an example time graph of results of an object-detection ML model being applied to track objects in video frames, according to some embodiments of this disclosure.

FIG. 4H is a graph diagram of an example time graph 480 of results of an object-detection ML model 268 (FIG. 2) being applied by an object classification engine 220 (FIG. 2) to determine objects in video frames 402; and FIG. 4I is a graph diagram of an example time graph 490 of results an object-detection ML model 268 being applied by an object classification engine 220 to track objects in video frames 402 (FIG. 4A), according to some embodiments of this disclosure. In other words, while the time graph 480 of FIG. 4H includes object being determined using the object detection engine 404 (FIG. 4A) of the object classification engine 220, FIG. 4I includes object that are tracked using the object tracking engine 406 (FIG. 4A) of the object classification engine 220. In one embodiment, the time graph 480 reflects results of the object classification engine 220 omitting the object tracking engine 406, while the time graph 490 reflects results of the object classification engine 220 employing the object tracking engine 406.

By tracking objects, an object that may temporarily disappear, for example, due to poor lighting conditions or poor image quality, may be accounted for despite no longer being detectable. For example, in FIG. 4H, three video frames 402A, 402B, and 402C are captured over time. In the third video frame 402C, the object may have become unidentifiable due to the poor lighting conditions and is no longer detected. However, by employing the object tracking engine 406 of the object classification engine 220, the object may continue to be tracked despite not being detectable by the object detection engine 404 of the object classification engine 220. In this manner, the objects may continue to be tracked despite poor lighting conditions or poor image resolution, and the change for detection discontinuity due to the false negative of the detection results (targeted objects not detected), can be significantly decreased.

Turning to FIG. 5A, depicted is a flow diagram of an example process 500 for post-processing data associated with classified objects, according to some embodiments of this disclosure. In some embodiments, the process illustrated in flow diagram 500 may be performed by the post-processing engine 240 (FIG. 2), which may receive (block 502) objects that have been identified, tracked, and classified may be output (block 408 of FIG. 4A) by the object classification engine 220 (FIG. 2). The post-processing engine 240 may include a data filter/smoother engine 504 and/or a data analyzer engine 506.

The filter/smoother engine 504 may remove the noise or fluctuations of the detection results from the minor instability of the loading/unloading environment. For example, the changing of light condition inside the storage compartment or poor image resolution resulting from low internet bandwidth can cause the classified objects (e.g., output by the object classification engine 220) to improperly detect certain objects during a short period of time or over a few video frames. Employing the data filter/smoother engine 504 may improve the estimation accuracy, as shown in FIG. 5C.

The data analyzer engine 506 may generate, at or near real-time, outputs (block 508) associated with the classified objects for which noise has been removed. In some embodiments, the data analyzer engine 506 may generate (block 508) two outputs: (1) real-time detection results and trailer information at each time stamp, and (2) up-to-date summary of the current trailer loading/unloading process. In some embodiments, the outputs (block 508) may be communicated by the object and fill-level analytics deploying engine 270 (FIG. 2).

With respect to (1) real-time detection results and trailer information at each time stamp, the trailer information may include trailer's dimensions (width, length, and height), source/destination location, trailer's ID, name of the current processing facility, camera ID, and/or bay number for the current loading/unloading process. The real-time detection results may include a number of humans, pallets, and many other targeted objects that were detected for every designated time stamp inside a loading/unloading trailer. During a trailer loading/unloading process, these real-time detection results and trailer information may be combined and uploaded to one or more storage devices, such as storage 260 (FIG. 2).

With respect to (2) up-to-date summary of the current trailer loading/unloading process, summary information of the detection results may be calculated and updated in every designated time stamps. This information may include an indication of the maximum/minimum number of the targeted objects (e.g., workers) and/or statuses, cumulated processing time, dock/trailer door open/close time, remaining number of targeted objects, and the like. At the end of a trailer loading/unloading process, the up-to-date summary and trailer information may be combined and uploaded to one or more storage devices, such as storage 260 (FIG. 2).

FIG. 5B is a graph diagram of a time graph 510 of results of an object-detection ML model 268 (FIG. 2) being applied by an object classification engine 220 (FIG. 2) before employing post-processing engine 240 (FIG. 2), while FIG. 5C is a graph diagram of an time graph 520 of results of an object-detection ML model 268 being applied by an object classification engine 220 employing post-processing engine 240, according to some embodiments of this disclosure. As illustrated, the first and second video frames 402A and 402B may include two objects, while the third and fourth video frames 402C and 402D may include one object. As illustrated in the time graph 510, no objects may be detected at the third and fourth video frames 402C and 402D when the post-processing engine 240 is not employed. However, as illustrated in the time graph 520, one object may be (accurately) detected at the third and fourth video frames 402C and 402D when the post-processing engine 240 is employed (e.g., to remove noise and perform the herein-referenced analysis on the video frames). By employing the post-processing engine 240, objects that may have not been detected at a particular video frame (e.g., at a particular time) may be accounted for. Therefore, objects, such as the pallet, load stand, and many other objects and corresponding statuses may be accounted for by employing post-processing engine 240 to an output of the object classification engine 220.

Figure 6A:
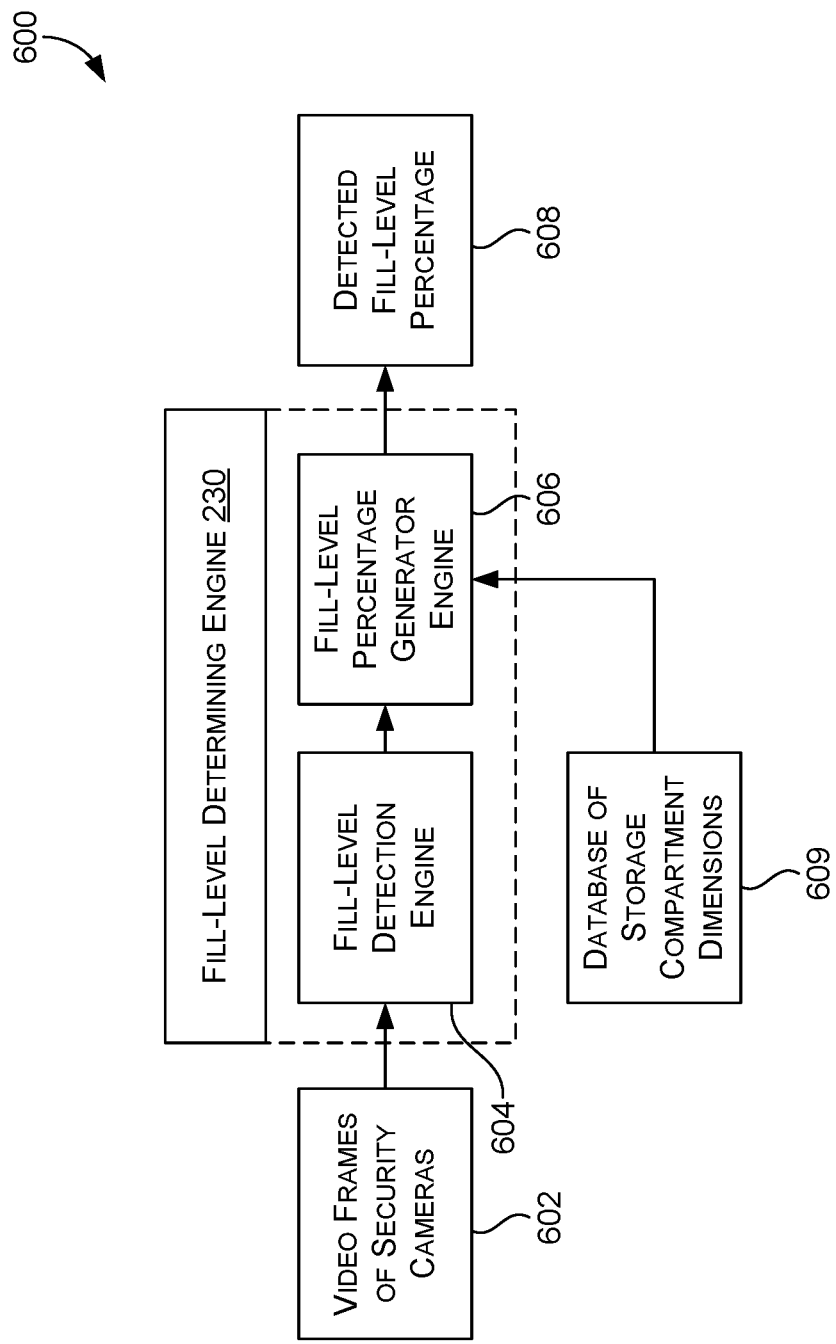
FIG. 6A is a flow diagram of an example process for determining and tracking a fill-level associated with from video frames captured by a camera, according to some embodiments of this disclosure.
Figure 6B:
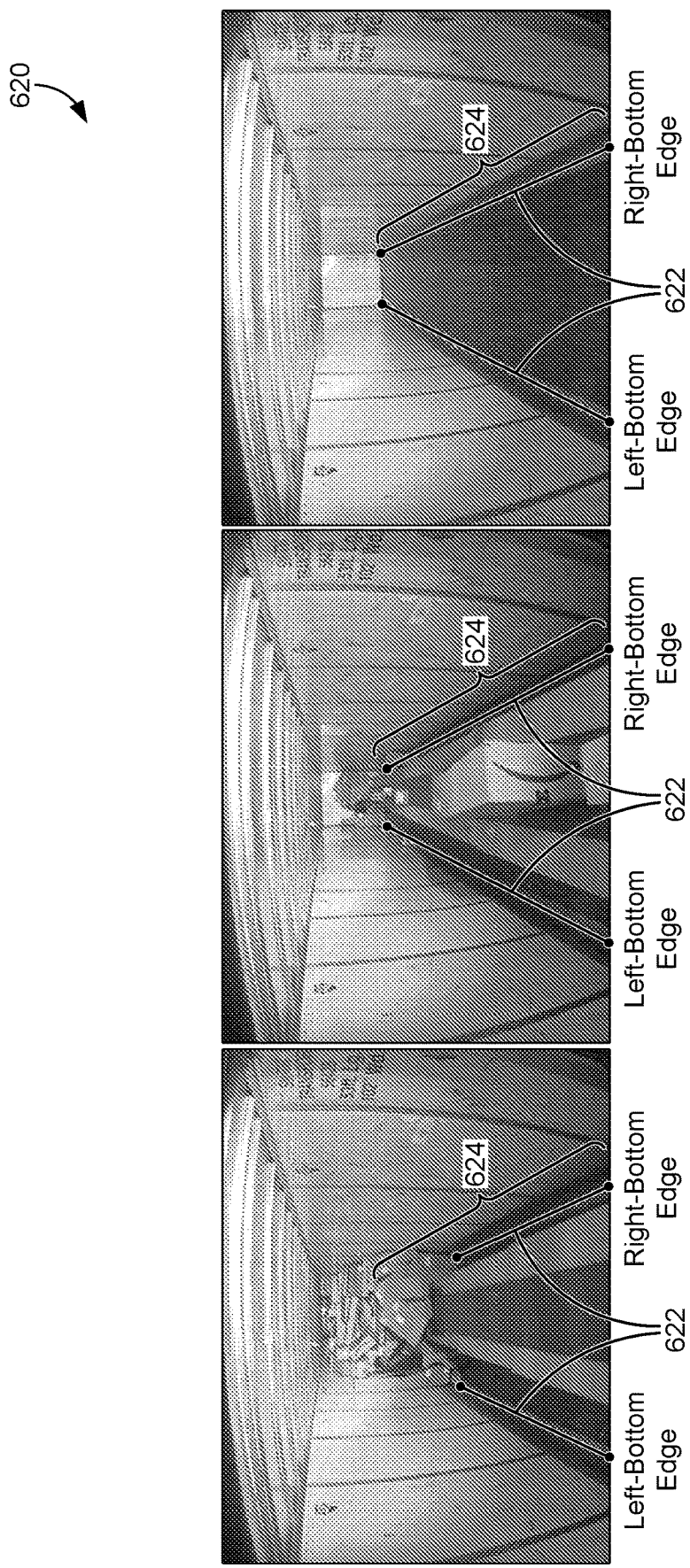
FIG. 6B is a screenshot of edges detected inside of a storage compartment by employing a fill-level ML model, according to some embodiments of this disclosure.

FIG. 6A is a flow diagram of an example process 600 for determining and tracking a fill-level associated with video frames 402 captured by a camera 105 (FIG. 1), according to some embodiments of this disclosure. In some embodiments, the object classification engine 220 (FIG. 2) receives video frames 402 from camera(s) 105 of the storage compartment. In some embodiment, the camera 105 may correspond to security cameras that are already installed and operating within the storage compartment.

In some embodiments, the object classification engine 220 includes a fill-level detection engine 604 and a fill-level percentage generator engine 606. The fill-level detection engine 604 may detect, in the video frames 402, edges corresponding to an intersection between walls of the inside of the storage compartment. The fill-level detection engine 604 may include one or more deep learning-based models. For example, the fill-level detection engine 604 may include at least one model that employs a UFAST methodology, a CondLaneNet methodology, FOLOLane methodology, or any suitable model that may detect edges to generate pixel information (e.g., orientation and size of edge and corresponding pixels) and fill-level data features. The fill-level detection engine 604 may be trained by the model generating engine 250 (FIG. 2). For example, the fill-level detection engine 604 may be continuously trained using images and/or videos collected from various trailer loading/unloading scenarios. In this manner, the object detection engine may produce more accurate results under changing loading/unloading environments such as changing of the lighting conditions of a loading/unloading environment, different loading/unloading background textures, and the like.

The fill-level detection engine 604 may receive image/video frames 402 from the cameras 105. In some embodiment, fill-level detection engine 604 may generate pixel information and features to generate the results of two edges, namely, the edges that correspond to the intersection between a floor of the storage compartment and side walls of the storage compartment. The fill-level detection engine 604 can estimate a storage compartment's parcel fullness by detecting both the bottom-right and bottom-left edges inside the storage compartment. Thereafter, the fill-level detection engine 604 may generate a set of pixel coordinates corresponding to the edges.

The fill-level percentage generator engine 606 may match the camera 105 information or storage compartment information to a database 609 (e.g., storage 260 of FIG. 2) of storage compartment dimensions, including the length. Thereafter, the fill-level percentage generator engine 606 may receive the storage compartment length (from the database 609) of the storage compartment from which the video frames 402 have been received. Based on the pixel coordinates for the two edges (as determined by the fill-level detection engine 604) and the length from the database 609, the fill-level percentage generator engine 606 may calculate and output (block 608) the fill-level, which may be expressed as a numeric or visual percentage, ratio, fraction, and the like. By determining the fill-level of a storage compartment, such as a trailer, during a loading/unloading process, operation teams and crews can better evaluate the efficiency of a loading/unloading process and determine how much time is left until completion.

FIG. 6B is a screenshot 620 of edges 622 being detected inside of a storage compartment by employing a fill-level ML model 269 (FIG. 2), according to some embodiments of this disclosure. As illustrated, the edges 622 may correspond to the visible portion of the intersection of the side walls with the floor surface. The edges 622 may correspond to the portion of the intersection of the side wall and the floor surface up until objects (in this example, boxes are detected). In some embodiments, the edges 622 may be collinear or parallel with an indication of the length 624 of the storage compartment. As discussed above, the fill-level may be determined based at least on a ratio between the length 624 of the storage compartment (e.g., trailer) and the edges 622. In one embodiment, the length 624 of the storage compartment and size of the edges 622 may be normalized so as to be in the same units of measurement. In some embodiments, the screenshots 620 illustrated in FIG. 6B may be produced by the trailer AI engine 210 (FIG. 2) and exported by the object and fill-level analytics deploying engine 270 (FIG. 2) to be presented on a display device.

Figure 6C:
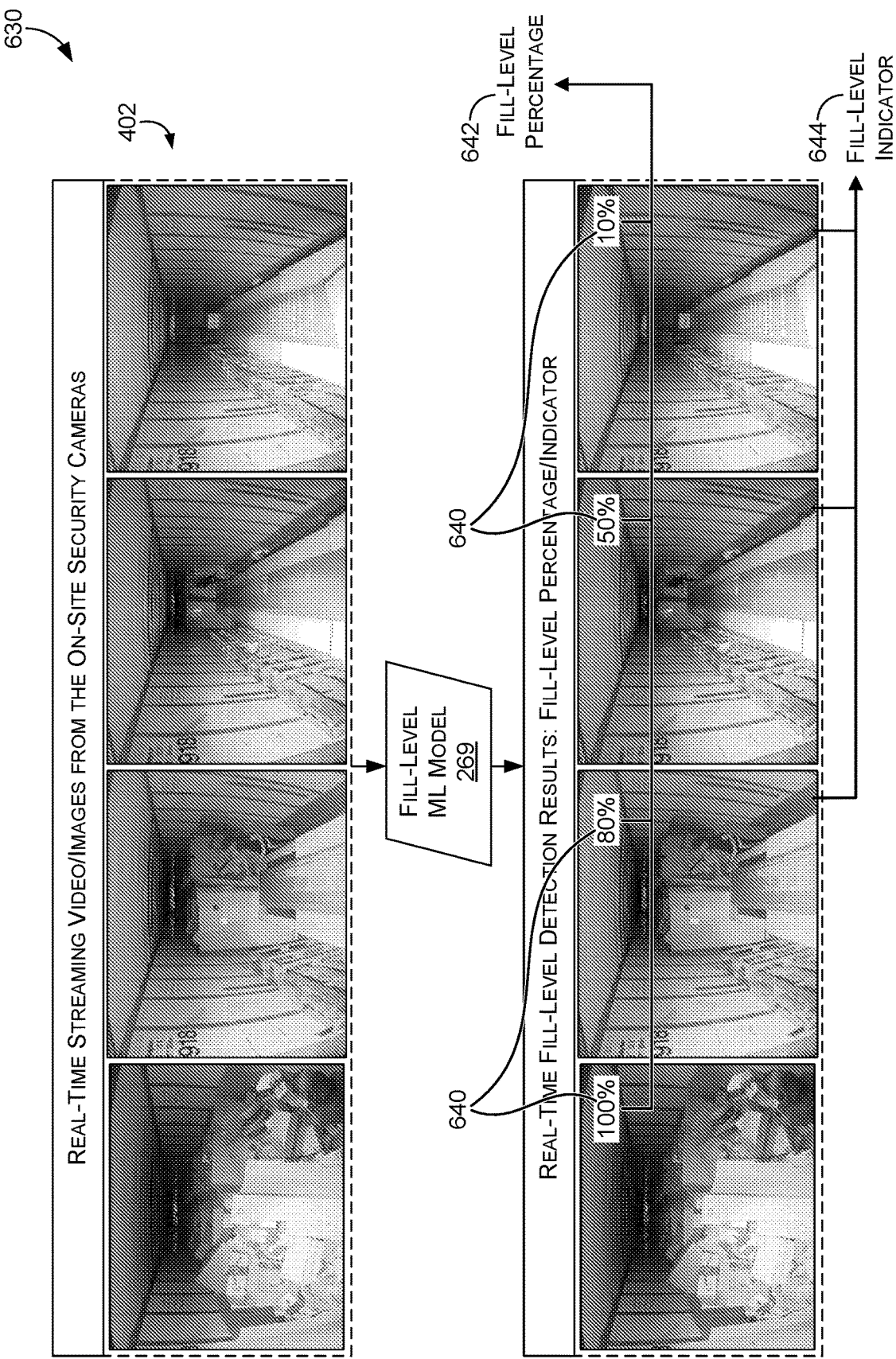
FIG. 6C is a screenshot of a fill-level ML model applied to determine a fill-level based on edges detected inside of a storage compartment, according to some embodiments of this disclosure.

FIG. 6C is a screenshot 630 of a fill-level ML model 269 (FIG. 2) applied to determine a fill-level based on edges 622 (FIG. 6B) detected inside of a storage compartment, according to some embodiments of this disclosure. In some embodiments, the fill-level ML model 269 may implement the fill-level determining engine 230 (FIG. 2) to determine the fill-level. In this example, four separate video frames 402 may be received by the fill-level ML model 269 (FIG. 2). In response to employing aspects of the fill-level determining engine 230 (FIG. 2), the fill-level 640 may be determined, for example, for each video frame 402. As illustrated, fill-level 640 may be present using any suitable visual indication, such as a fill-level percentage 642 and/or a fill-level bar indicator 644. In one embodiment, the fill-level bar indicator 644 may be visually distinct to correspond to any percentage range. For example, the fill-level bar indicator 644 may be green for a fill-level between 80% and 100%, yellow for a fill-level between 40% and 80%, and/or red for a fill-level between 0% and 40%.

Figure 7A:
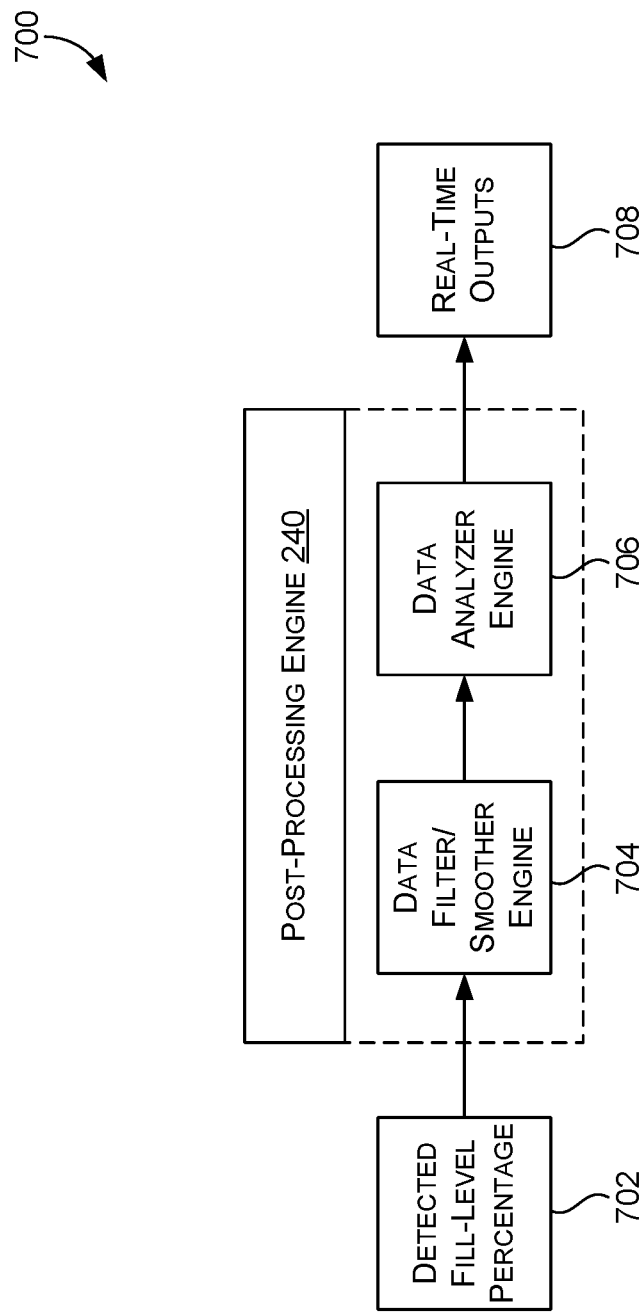
FIG. 7A is a flow diagram of an example process for post-processing data associated with fill-level, according to some embodiments of this disclosure.

Turning to FIG. 7A, depicted is a flow diagram of an example process 700 for post-processing data associated with fill-level, according to some embodiments of this disclosure. In some embodiments, the process 500 illustrated in FIG. 5A may be performed by the post-processing engine 240 (FIG. 2), which may receive (block 702) a fill-level that has been determined and output (block 608 of FIG. 6A) by the fill-level determining engine 230 (FIG. 2). The post-processing engine 240 may include a data filter/smoother engine 704 and/or a data analyzer engine 706.

The data filter/smoother engine 704 may remove the noise or fluctuations of the detection results from the minor instability of the loading/unloading environment. For example, the changing of light condition inside the storage compartment, the material of the inside of the storage compartment, the object (e.g., parcel) distribution within the storage compartment, or poor image resolution resulting from low internet bandwidth can cause the detected edges 622 (FIG. 6B) (e.g., output by the fill-level determining engine 230) to improperly (or not) detect certain edges 622 during a short period of time or over a few video frames 402. Employing the data filter/smoother engine 704 may improve the estimation accuracy, as shown in FIGS. 7B and 7C.

The data analyzer engine 706 may determine idle sections of the received (block 702) fill-level results. The idle sections may correspond to a time period or length of time during which the fill-level did not change, for example, because items were not unloaded or loaded. In some embodiments, after the data filter/smoother engine 704 processes the received (block 702) fill-level results, the data analyzer engine 706 may extract candidate idle sections from the cumulative processed fill-level result. The start and end time associated with these idle sections can be computed based on the analysis of those processed fill-level results. The idle sections 742 (FIG. 7C) are illustrated as the flat horizontal regions. Information associated with the idle sections, as well as the start and end time of a trailer loading/unloading process can provide insights to the operation teams, allowing them to evaluate the speed and efficiency of a loading/unloading process.

Figure 7B:
FIG. 7B is a graph diagram of an example time graph of results of a fill-level ML model employing a post-processing engine, according to some embodiments of this disclosure.
Figure 7C:
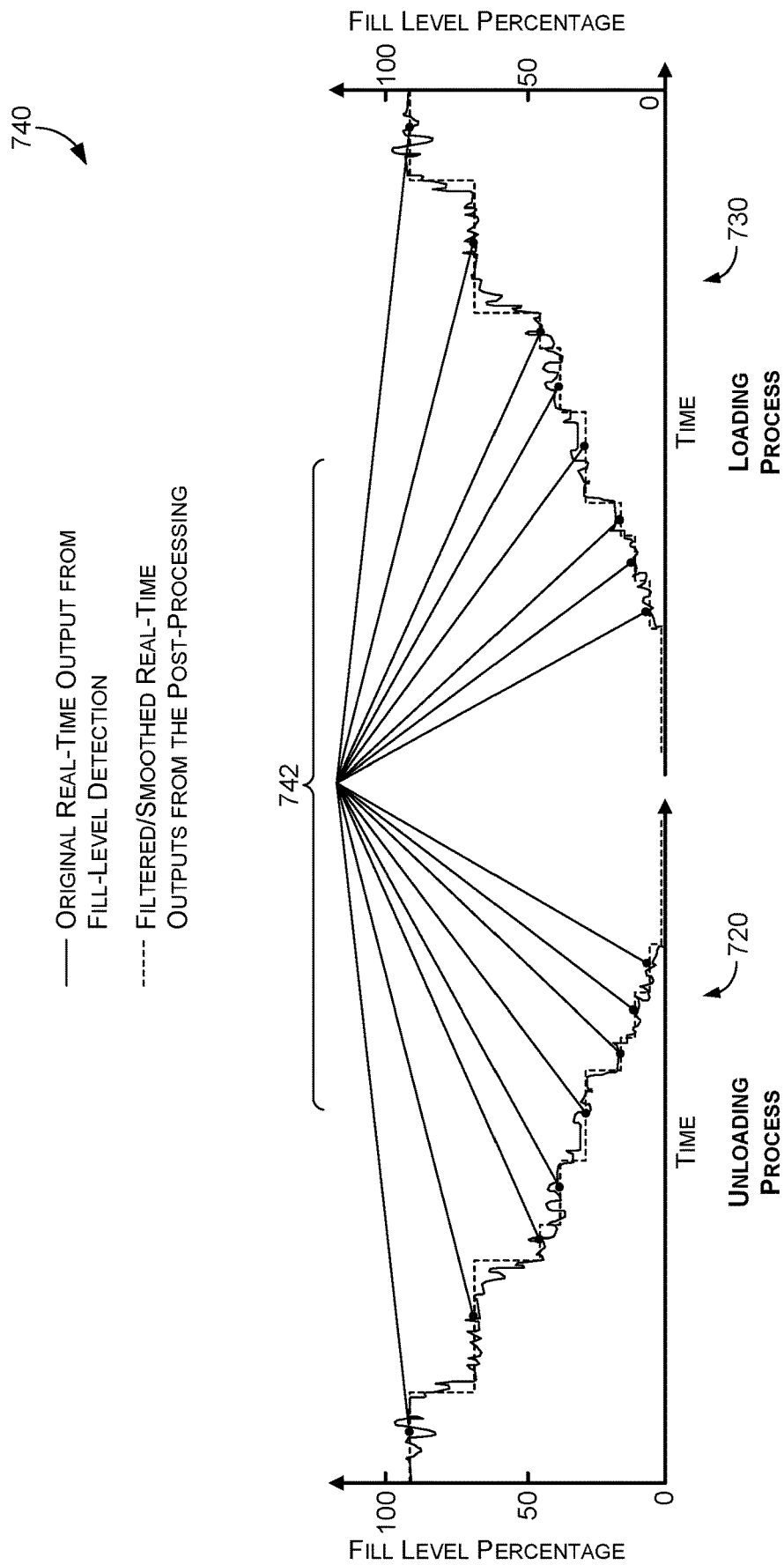
FIG. 7C is a graph diagram of an example time graph of results of a fill-level ML model being employing a post-processing engine, according to some embodiments of this disclosure.

FIGS. 7B and 7C depict respective graph diagrams 710 and 740 of time graphs 720 and 730 plotting results of a fill-level ML model 269 (FIG. 2) employing a post-processing engine 240 (FIG. 2), according to some embodiments of this disclosure. As illustrated, an unloading process is depicted by a first graph 720 and a loading process is depicted by a second graph 730. During the unloading process, the fill-level may reduce overtime as items are unloaded. On the other hand, during the loading process, the fill-level may increase over time as items are loaded. In this example, the solid line depicts the fill-level determined at or near real time, for example, by the fill-level determining engine 230 (FIG. 2), while the dashed line depicts the fill-level after the filter/smoother engine 704 (FIG. 7A) may remove the noise or fluctuations of the detection results. As illustrated in FIG. 7C, the idle sections 742 are illustrated as the flat horizontal regions.

Figure 8:
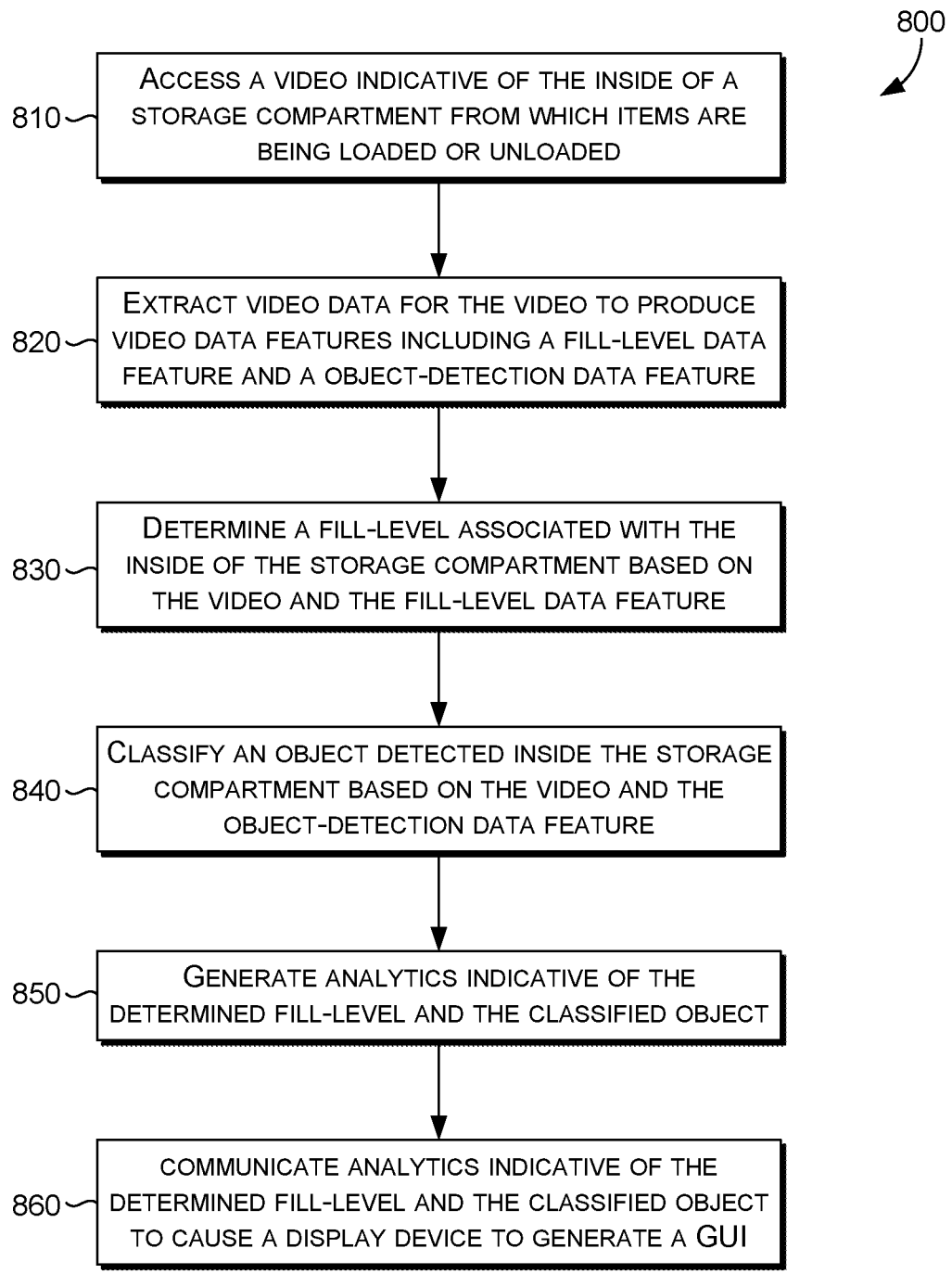
FIG. 8 is a flow diagram of an example process for generating and communicating analytics indicative of a fill-level and a classified object, according to some embodiments of this disclosure.

Turning now to FIG. 8, depicted is a flow diagram of process 800 for generating and communicating analytics indicative of a fill-level and a classified object, according to some embodiments of this disclosure. Process 800 (and processes 900 and 1000 of FIGS. 9 and 10, respectively) and/or any of the functionality described herein may be performed by processing logic that comprises hardware (e.g., circuitry, dedicated logic, programmable logic, microcode), software (e.g., instructions run on a processor to perform hardware simulation), firmware, or a combination thereof. Although particular blocks described in this disclosure are referenced in a particular order or a particular quantity, it is understood that any block may occur substantially parallel with or before or after any other block.

Embodiments of example processes 800, 900, and/or 1000 may be carried out using a computer system having components described in connection with example system 200 (FIG. 2). In particular, additional details of the various blocks and operations performed in processes 800, 900, and/or 1000 are described in connection with FIG. 2 and example system 200. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer storage median as described herein may perform or be caused to perform the process 800 (or processes 900 and/or 1000) or any other functionality described herein.

Per block 810, particular embodiments include accessing a video indicative of the inside of a storage compartment from which items are being loaded or unloaded. In one embodiment, the video collector 212 (FIG. 2) may receive the video.

Per block 820, particular embodiments include extracting video data for the video based at least on the items being loaded or unloaded from inside of the storage compartment to produce a plurality of video data features comprising a fill-level data feature and an object-detection data feature. In some embodiments, the partitioning engine 214 (FIG. 2), the object feature training module 222 (FIG. 2), and/or the fill-level feature training module 232 (FIG. 2) may extract the video data.

Per block 830, particular embodiments include determining, using a fill-level ML model 269 (FIG. 2), a fill-level associated with the inside of the storage compartment based on at least the video and the fill-level data feature. In one embodiment, the fill-level determining engine 230 (FIG. 2) may determine the fill-level and/or employ the fill-level ML model 269 (FIG. 2).

Per block 840, particular embodiments include classifying, using an object-detection ML model 268 (FIG. 2), an object detected inside of the storage compartment based at least on the video and the object-detection data feature. In one embodiment, the object classification engine 220 (FIG. 2) may detect, classify, and/or track the object.

Per block 850, particular embodiments include generating analytics indicative of the determined fill-level and the classified object. In one embodiment, the trailer AI engine 210 (FIG. 2) may generate the analytics.

Per block 860, particular embodiments include communicating the analytics to a display device to cause the display device to generate a GUI, such as the GUI illustrated in the figures described herein. In one embodiment, the object and fill-level analytics deploying engine 270 (FIG. 2) may communicate the analytics.

Figure 9:
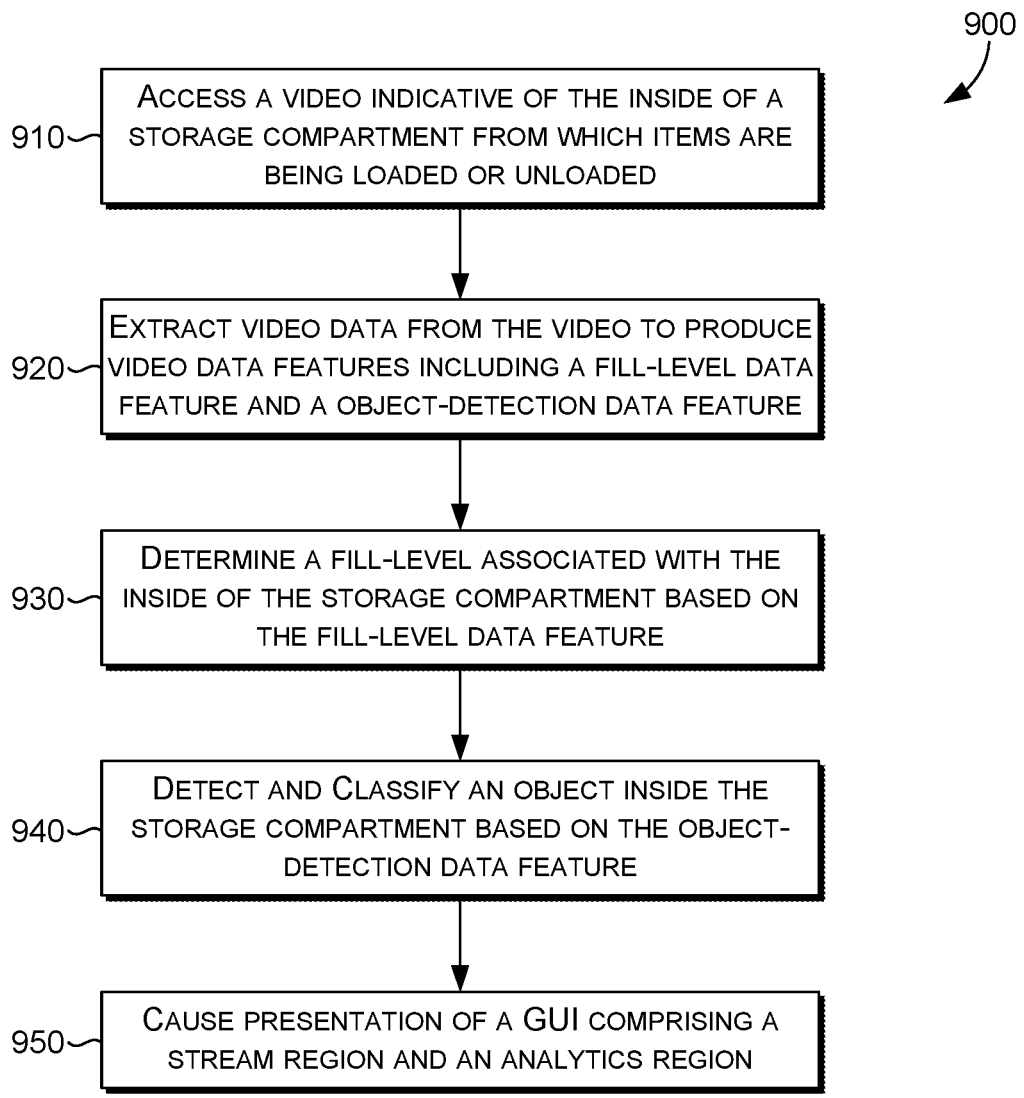
FIG. 9 is a flow diagram of an example process for causing presentation of a GUI that includes a stream region and an analytics region, according to some embodiments of this disclosure.

Turning to FIG. 9, depicted is a flow diagram of an example process 900 for causing presentation of a GUI that includes a stream region 330 (FIG. 3B) and/or an analytics region 332 (FIG. 3B), according to some embodiments of this disclosure. Per block 910, particular embodiments include accessing a video indicative of the inside of a storage compartment from which items are being loaded or unloaded. In one embodiment, the video collector 212 (FIG. 2) may receive the video.

Per block 920, particular embodiments include extracting video data for the video based at least on the items being loaded or unloaded from inside of the storage compartment to produce a plurality of video data features comprising a fill-level data feature and an object-detection data feature. In some embodiments, the partitioning engine 214 (FIG. 2), the object feature training module 222 (FIG. 2), and/or the fill-level feature training module 232 (FIG. 2) may extract the video data.

Per block 930, particular embodiments include determining a fill-level associated with the inside of the storage compartment based on at least the fill-level data feature. In one embodiment, the fill-level determining engine 230 (FIG. 2) may determine the fill-level and/or employ the fill-level ML model 269 (FIG. 2).

Per block 940, particular embodiments include detecting and classifying an object inside of the storage compartment based at least on the object-detection data feature. In one embodiment, the object classification engine 220 (FIG. 2) may detect, classify, and/or track the object.

Per block 950, particular embodiments include causing presentation of a GUI that includes a stream region 330 and an analytics region 332, such as the GUIs described herein (e.g., FIGS. 3B and 3C). The stream region may include a stream of the video at or near real-time. The analytics region may include analytics indicative of progress in the items being loaded or unloaded from the storage compartment based on the determined fill-level and the object. In one embodiment, the object and fill-level analytics deploying engine 270 may communicate the analytics.

Figure 10:
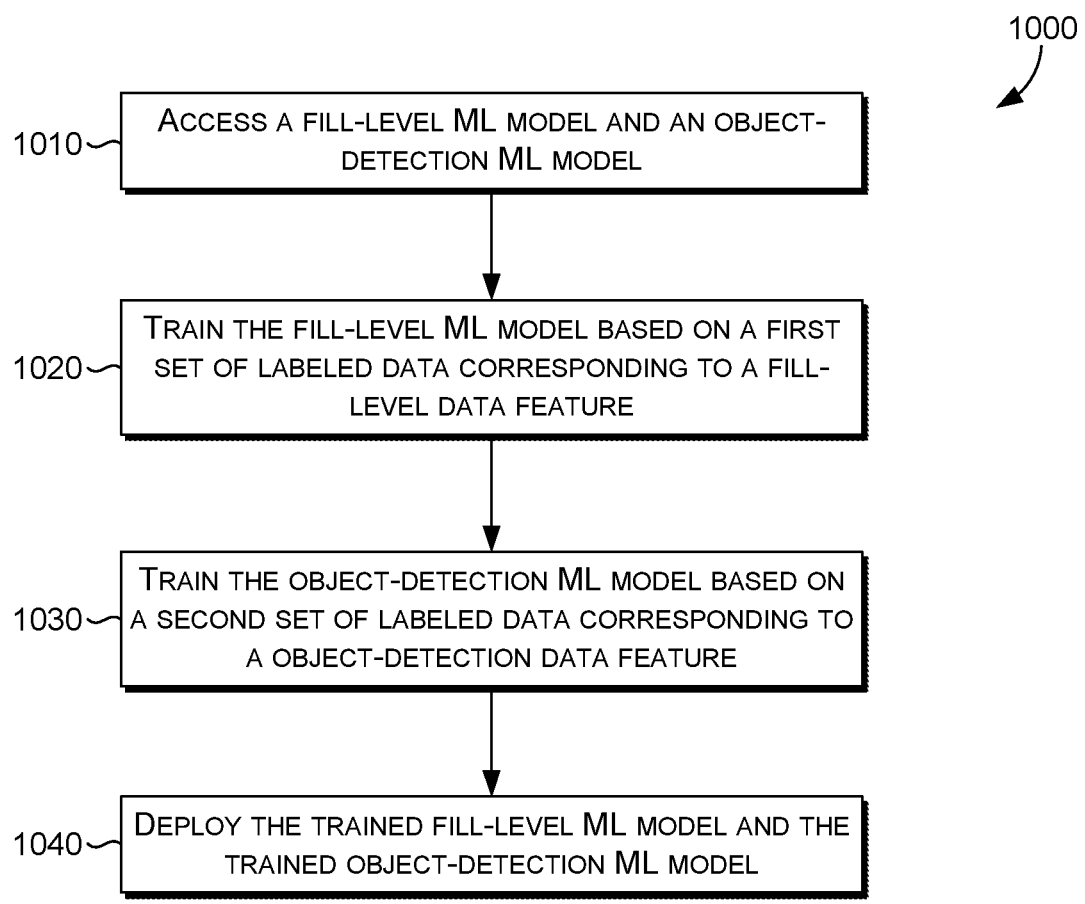
FIG. 10 is a flow diagram of an example process for deploying a trained fill-level ML model and a trained object-detection ML model, according to some embodiments of this disclosure.

Turning to FIG. 10, depicted a flow diagram of an example process 1000 for deploying a trained fill-level ML model and a trained object-detection ML model, according to some embodiments of this disclosure. Per block 1010, particular embodiments include accessing a fill-level ML model 269 (FIG. 2) and an object-detection ML model 268 (FIG. 2). In one embodiment, the fill-level ML model 269 and an object-detection ML model 268 may be accessed from storage 260 (FIG. 2).

Per block 1020, particular embodiments include training the fill-level ML model 269 (FIG. 2) based on a first set of labeled data corresponding to a fill-level data feature, of a plurality of video data features, indicative of a fill-level of items being loaded or unloaded from a storage compartment. In some embodiments, the fill-level ML model 269 may be trained using the model generating engine 250 (FIG. 2).

Per block 1030, particular embodiments include training the object-detection ML model 268 (FIG. 2) based on a second set of labeled data corresponding to an object-detection data feature, of a plurality of video data features, indicative of a classified object within the storage compartment. In some embodiments, the object-detection ML model 268 may be trained using the model generating engine 250 (FIG. 2).

Per block 1040, particular embodiments include deploying the trained object-detection ML model 268 (FIG. 2) and the trained fill-level ML model 269 (FIG. 2) to a computing device. In one embodiment, the object and fill-level analytics deploying engine 270 (FIG. 2) may deploy the trained object-detection ML model and the trained fill-level ML model.

Having described various embodiments of the disclosure, an exemplary computing environment suitable for implementing embodiments of the disclosure is now described. With reference to FIG. 11, an exemplary computing device is provided and referred to generally as computing device 1100. The computing device 1100 is but one example of a suitable computing environment and is not intended to suggest any limitation as to the scope of use or functionality of the disclosure. Neither should the computing device 1100 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, or similar computing or processing devices. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 11, computing device 1100 includes a bus 1110 that directly or indirectly couples the following devices: memory 1112, one or more processors 1114, one or more presentation components 1116, one or more input/output (I/O) ports 1118, one or more I/O components 1120, and an illustrative power supply 1122. Bus 1110 represents what may be one or more busses (such as an address bus, data bus, or combination thereof). Although the various blocks of FIG. 11 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 11 is merely illustrative of an exemplary computing device that can be used in connection with one or more embodiments of the present disclosure. Distinction is not made between such categories as "workstation," "server," "laptop," "handheld device," or the like, as all are contemplated within the scope of FIG. 11 and with reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may include computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1112 includes computer storage media in the form of volatile and/or nonvolatile memory. The memory may be removable, non-removable, or a combination thereof. Exemplary hardware devices include solid-state memory, hard drives, optical-disc drives, and similar physical storage media. Computing device 1100 includes one or more processors 1114 that read data from various entities such as memory 1112 or I/O components 1120. Presentation component(s) 1116 presents data indications to a user or other device. Exemplary presentation components include a display device, speaker, printing component, vibrating component, and the like.

The I/O ports 1118 allow computing device 1100 to be logically coupled to other devices, including I/O components 1120, some of which may be built in. Illustrative components include, by way of example and not limitation, a microphone, joystick, game pad, satellite dish, scanner, printer, wireless device, and other I/O components. The I/O components 1120 may provide a natural user interface (NUI) that processes air gestures, voice, or other physiological inputs generated by a user. In some instances, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as stereoscopic camera systems, infrared camera systems, red-green-blue (RGB) camera systems, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

Some embodiments of computing device 1100 may include one or more radio(s) 1124 (or similar wireless communication components). The radio 1124 transmits and receives radio or wireless communications. The computing device 1100 may be a wireless terminal adapted to receive communications and media over various wireless networks. Computing device 1100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communication network, such as a wireless local-area network (WLAN) connection using the 802.11 protocol; a Bluetooth connection to another computing device is a second example of a short-range connection, or a near-field communication connection. A long-range connection may include a connection using, by way of example and not limitation, one or more CDMA, GPRS, GSM, TDMA, and 802.16 protocols.

Figure 12:
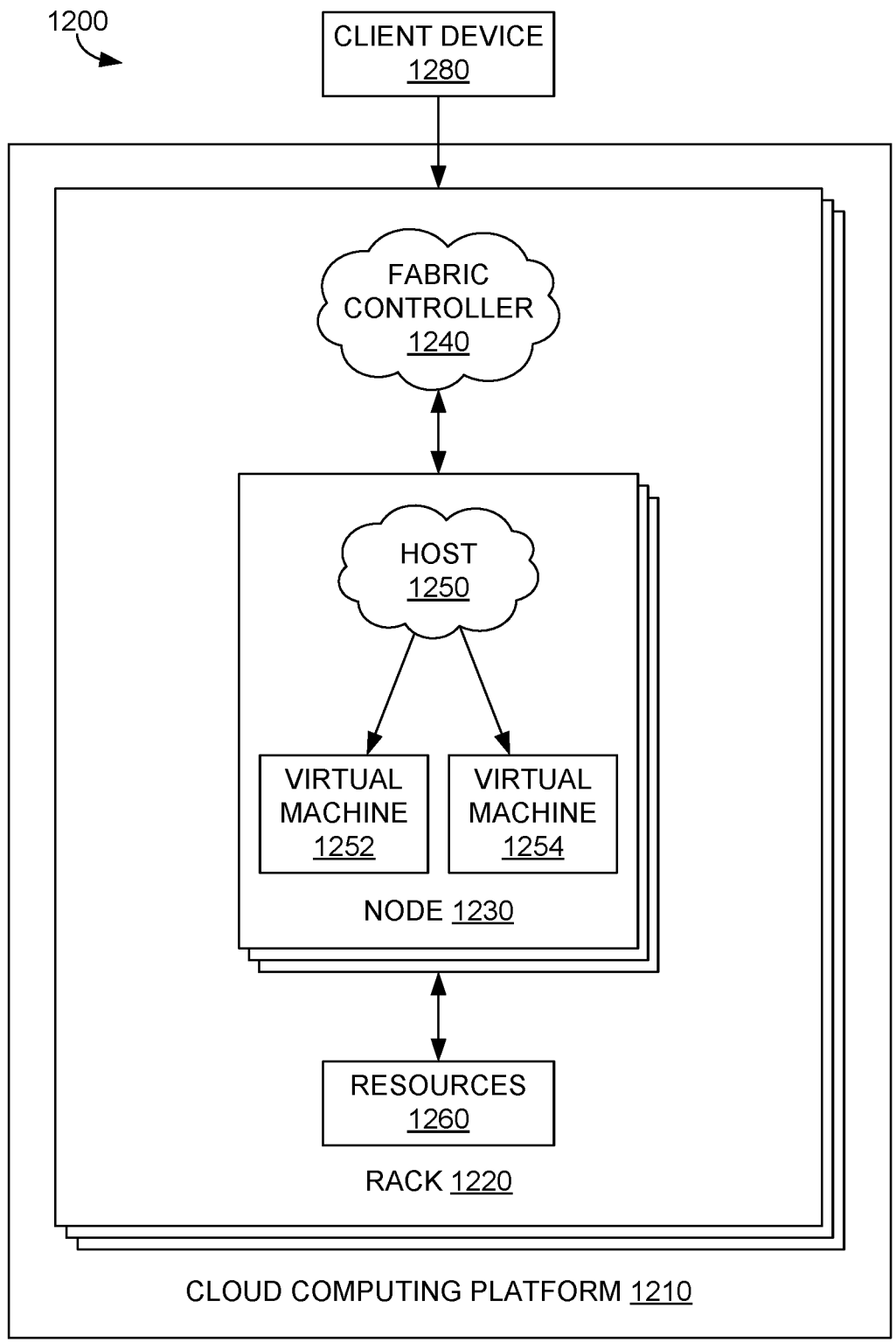
FIG. 12 is a block diagram of a computing environment in which embodiments of the present disclosure may be employed.

Referring now to FIG. 12, FIG. 12 illustrates an example distributed computing environment 1200 in which implementations of the present disclosure may be employed. In particular, FIG. 12 shows a high level architecture of an example cloud computing platform 1210 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support a distributed computing environment 1200 that includes a cloud computing platform 1210, a rack 1220, and a node 1230 (e.g., computing devices, processing units, or blades) in the rack 1220. The technical solution environment can be implemented with a cloud computing platform 1210 that runs cloud services across different data centers and geographic regions. A cloud computing platform 1210 can implement a fabric controller 1240 component for provisioning and managing resource allocation, deployment, upgrade, and management of cloud services. Typically, a cloud computing platform 1210 acts to store data or run service applications in a distributed manner. A cloud computing platform 1210 in a data center can be configured to host and support operation of endpoints of a particular service application. A cloud computing platform 1210 may be a public cloud, a private cloud, or a dedicated cloud.

Node 1230 can be provisioned with host 1250 (e.g., operating system or runtime environment) running a defined software stack on node 1230. Node 1230 can also be configured to perform specialized functionality (e.g., compute nodes or storage nodes) within cloud computing platform 1210. Node 1230 is allocated to run one or more portions of a service application of a tenant. A tenant can refer to a customer utilizing resources of the cloud computing platform 1210. Service application components of a cloud computing platform 1210 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 1230, nodes 1230 may be partitioned into virtual machines (e.g., virtual machine 1252 and virtual machine 1254). Physical machines can also concurrently run separate service applications. The virtual machines or physical machines can be configured as individualized computing environments that are supported by resources 1260 (e.g., hardware resources and software resources) in the cloud computing platform 1210. It is contemplated that resources can be configured for specific service applications. Further, each service application may be divided into functional portions such that each functional portion is able to run on a separate virtual machine. In the cloud computing platform

1210, multiple servers may be used to run service applications and perform data storage operations in a cluster. In particular, the servers may perform data operations independently but exposed as a single device referred to as a cluster. Each server in the cluster can be implemented as a node.

The client device 1280 may be linked to a service application in the cloud computing platform 1210. The client device 1280 may be any type of computing device, such as a user device 102a (FIG. 1), and the client device 1280 can be configured to issue commands to the cloud computing platform 1210. In embodiments, the client device 1280 may communicate with service applications through a virtual Internet Protocol (IP) and load balancer or other means that direct communication requests to designated endpoints in the cloud computing platform 1210. The components of the cloud computing platform 1210 may communicate with each other over a network (not shown), which may include, without limitation, one or more local area networks (LANs) and/or wide area networks (WANs).

Many different arrangements of the various components depicted, as well as components not shown, are possible without departing from the scope of the claims below. Embodiments of the present disclosure have been described with the command to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. At least one computer-storage media having computer-executable instructions embodied thereon that, when executed by a computing system having a processor and memory, cause the processor to perform operations comprising:
   accessing a video indicative of the inside of a storage compartment from which items are being loaded or unloaded;
   extracting video data for the video based at least on the items being loaded or unloaded from inside of the storage compartment to produce a plurality of video data features comprising a fill-level data feature and an object-detection data feature;
   determining, using a fill-level machine learning (ML) model, a fill-level associated with the inside of the storage compartment based on at least the video and the fill-level data feature of the plurality of video data features;

classifying, using an object-detection ML model, an object detected inside of the storage compartment based at least on the video and the object-detection data feature of the plurality of video data features;

generating analytics indicative of the fill-level and the object; and communicating the analytics to a display device to cause the display device to generate a graphical user interface (GUI).

2. The at least one computer-storage media of claim 1, wherein the video is received from a monocular camera.

3. The at least one computer-storage media of claim 1, wherein the GUI comprises a stream region that comprises a live stream of the video and a fill-level indication.

4. The at least one computer-storage media of claim 1, wherein the GUI comprises an analytics region that comprises an indication of at least one of: a door open time, a door close time, a door open period, a human enter time, a human exit time, a maximum number of workers, a working hours, or a number of pallets.

5. The at least one computer-storage media of claim 1, wherein the fill-level ML model is trained, using supervised machine learning, based on labeled data indicative of at least one of an edge, a length of the edge, an orientation of the edge, or an area coordinate associated with the storage compartment.

6. The at least one computer-storage media of claim 1, wherein the object-detection ML model is trained, using supervised machine learning, based on labeled data indicative of at least one of a human object, a pallet object, a load stand object, a parcel retainer object, a parcel on a conveyer belt object, a forever bag object, the conveyer belt object, or a small container object.

7. The at least one computer-storage media of claim 1, wherein:
the analytics indicative of the fill-level indicate the items stored in the storage compartment; and
the analytics indicative of the object indicate whether the object corresponds to a human object, a pallet object, a load stand object, a parcel retainer object, a parcel, a forever bag object, a conveyer belt object, or a small container object.

8. The at least one computer-storage media of claim 1, wherein the object-detection data features comprises at least one of:
an object feature comprising at least one of: a human object, a pallet object, a load stand object, a parcel retainer object, a parcel, a forever bag object, a conveyer belt object, or a small container object; or
a status feature comprising at least one of: a door open status, a door closed status, a door partially open status, a door open but trailer not ready status, or an unloading or loading completed status.

9. The at least one computer-storage media of claim 1, wherein the fill-level data features comprises at least one of: an edge detection, an edge length, an edge orientation, or area coordinates associated with the storage compartment.

10. A computerized system comprising:
at least one computer processor; and
computer memory storing computer-useable instructions that, when used by the at least one computer processor, cause the at least one computer processor to perform operations comprising:
accessing a video indicative of the inside of a storage compartment from which items are being loaded or unloaded;
extracting video data for the video based at least on the items being loaded or unloaded from inside of the storage compartment to produce a plurality of video data features comprising a fill-level data feature and an object-detection data feature;
determining a fill-level associated with the inside of the storage compartment based on at least the fill-level data feature of the plurality of video data features;
detecting and classifying an object inside of the storage compartment based at least on the object-detection data feature of the plurality of video data features; and
causing presentation of a graphical user interface (GUI) comprising:
a stream region comprising a stream of the video; and
an analytics region comprising analytics indicative of a progress in the items being loaded or unloaded from the storage compartment based on the fill-level and the object.

11. The computerized system of claim 10, wherein causing the presentation of the GUI comprises:
updating the stream region to continue playing the stream of the video; and
removing an indication associated with the object when the object disappears from the stream of the video or adding another indication when another object is classified.

12. The computerized system of claim 10, wherein the stream region comprises an indication associated with the object that comprises a visually distinct symbol based on classifying the object.

13. The computerized system of claim 10, wherein an indication associated with the object is determined based on a Kalman filter that compares a current detected state of the object with a predicted state of the object, wherein the indication associated with the object corresponds to whether the object appears in the stream of the video.

14. The computerized system of claim 10, wherein the video is received from a monocular camera positioned within or on a vehicle that comprises the storage compartment.

15. The computerized system of claim 10, wherein the analytics indicative of the progress comprises an indication corresponding to at least one of: a door open status, a door closed status, a door partially open status, a door open but trailer not ready status, or an unloading or loading completed status.

16. The computerized system of claim 10, wherein the object comprises at least one of: a human object, a pallet object, a load stand object, a parcel retainer object, a parcel on a conveyer belt object, a forever bag object, the conveyer belt object, or a small container object.

17. A computer-implemented method comprising:
accessing a fill-level machine learning (ML) model and an object-detection ML model;
training the fill-level ML model based on a first set of labeled data corresponding to a fill-level data feature, of a plurality of video data features, indicative of a fill-level of items being loaded or unloaded from a storage compartment;
validating the fill-level ML model based on a first set of unlabeled data applied to a first corresponding loss function;
training the object-detection ML model based on a second set of labeled data corresponding to an object-detection data feature, of the plurality of video data features, indicative of a classified object within the storage compartment;

validating the object-detection ML model based on a second set of unlabeled data applied to a second corresponding loss function; and deploying the object-detection ML model and the fill-level ML model to a computing device.

18. The computer-implemented method of claim 17, wherein the first set of labeled data comprises edges, from a video frame, that have been identified as an intersection between surfaces defining an edge of an inside of the storage compartment.

19. The computer-implemented method of claim 17, wherein the second set of labeled data comprises objects, from a video frame, that have been identified as at least one of: a human object, a pallet object, a load stand object, a parcel retainer object, a parcel on a conveyer belt object, a forever bag object, the conveyer belt object, or a small container object.

* * * * *

UNITED STATES PATENT AND TRADEMARK OFFICE
CERTIFICATE OF CORRECTION

PATENT NO. : 12,299,627 B2  
APPLICATION NO. : 17/853748  
DATED : May 13, 2025  
INVENTOR(S) : Youngjun Choi, Po-Nien Lin and Hyunki Lee Page 1 of 1

It is certified that error appears in the above-identified patent and that said Letters Patent is hereby corrected as shown below:

In the Claims

Column 39, Claim 8, Line 45:  
In the line reading "wherein the object-detection data features comprises at least" should read  
-- wherein the object-detection data feature comprises at least --

Column 39, Claim 9, Line 56:  
In the line reading "wherein the fill-level data features comprises at least on of:" should read  
-- wherein the fill-level data feature comprises at least on of: --

Signed and Sealed this  
First Day of July, 2025

Coke Morgan Stewart  
*Acting Director of the United States Patent and Trademark Office*